US012615545B2

(12) United States Patent
Esswie

(10) Patent No.: US 12,615,545 B2
(45) Date of Patent: *Apr. 28, 2026

(54) ADAPTIVE BUFFER STATUS REPORTING

(71) Applicant: Dell Products, L.P., Round Rock, TX (US)

(72) Inventor: Ali Esswie, Montreal (CA)

(73) Assignee: Dell Products L.P., Round Rock, TX (US)

( * ) Notice: Subject to any disclaimer, the term of this patent is extended or adjusted under 35 U.S.C. 154(b) by 636 days.

This patent is subject to a terminal disclaimer.

(21) Appl. No.: 17/978,856

(22) Filed: Nov. 1, 2022

(65) Prior Publication Data

US 2024/0147300 A1 May 2, 2024

(51) Int. Cl.
*H04W 28/02* (2009.01)
*H04W 72/21* (2023.01)

(52) U.S. Cl.
CPC ....... *H04W 28/0278* (2013.01); *H04W 72/21* (2023.01)

(58) Field of Classification Search
CPC ............. H04W 28/0278; H04W 72/21; H04W 28/0268
See application file for complete search history.

(56) References Cited

U.S. PATENT DOCUMENTS

| | | | |
|---|---|---|---|
| 8,031,655 | B2 | 10/2011 | Ye et al. |
| 2008/0081628 | A1 | 4/2008 | Ye et al. |
| 2019/0335357 | A1* | 10/2019 | Shi ........................ H04W 28/06 |

(Continued)

FOREIGN PATENT DOCUMENTS

| | | |
|---|---|---|
| EP | 3576454 | 12/2019 |
| WO | 2019/062461 | 4/2019 |

(Continued)

OTHER PUBLICATIONS

Technical specifications (TS) 38.201—"5G; Nr; Physical layer; General description", 3GPP TS 38.201 version 15.0.0 Release 15, Sep. 2018, 14 pages.

(Continued)

*Primary Examiner* — Habte Mered

(74) *Attorney, Agent, or Firm* — Amin, Turocy & Watson, LLP

(57) ABSTRACT

A variable buffer status report configuration is transmitted from a wireless communication network node to a user equipment. The configuration may comprise one or more functions to calculate a buffer status report indication that indicates, or to calculate a table that is used to indicate, a metric related to a buffer, or related to uplink traffic stored in a buffer, of the user equipment. The configuration may comprise a function to determine a precision variable that corresponds to a step size between different criteria, or criteria functions, that are used to determine a buffer status report indication. Buffer status report indications may vary in size based on a value of the indication. A user equipment may apply different received configurations, or functions thereof, to determine buffer status report indications based on different parameters, such as traffic type, traffic Quality of Service, buffer size, or amount of buffered uplink traffic.

20 Claims, 18 Drawing Sheets

(56)                References Cited

U.S. PATENT DOCUMENTS

| | | | | |
|---|---|---|---|---|
| 2020/0045577 | A1* | 2/2020 | Yu | H04W 72/1268 |
| 2023/0247478 | A1* | 8/2023 | Wang | H04W 28/0278 |
| | | | | 370/235 |
| 2024/0147299 | A1 | 5/2024 | Esswie | |

FOREIGN PATENT DOCUMENTS

| | | |
|---|---|---|
| WO | 2022/025815 | 2/2022 |
| WO | 2024/004803 | 1/2024 |

OTHER PUBLICATIONS

Technical specifications (TS) 38.331—"5G; NR; Radio Resource Control (RRC); Protocol specification", 3GPP TS 38.331 version 16.1.0 Release 16, Jul. 2020, 886 pages.
Technical specifications (TS) 38.211—"5G; NR; Physical channels and modulation", 3GPP TS 38.211 version 16.2.0 Release 16, Jul. 2020, 136 pages.
Technical specifications (TS) 38.304—"5G; NR; User Equipment (UE) procedures in idle mode and in RRC Inactive state", 3GPP TS 38.304 version 16.1.0 Release 16, Jul. 2020, 41 pages.
Technical specifications (TS) 38.300—"5G; NR; NR and NG-RAN Overall description; Stage-2" 3GPP TS 38.300 version 16.4.0 Release 16, Jan. 2021, 151 pages.
International Search Report and Written Opinion for PCT Application No. PCT/US2023/034358 mailed Jan. 29, 2024, 15 pages.
International Search Report and Written Opinion for PCT Application No. PCT/US2023/034357 mailed Feb. 1, 2024, 22 pages.
Qualcomm Incorporated. "Capacity enhancements for XR traffic", 3GPP Draft; R2-2207050, 3GPP TSG-RAN WG2 Meeting #119-e, e-Meeting, Aug. 10, 2022 [https://ftp.3gpp.org/tsg_ran/WG2_RL2/T SGR2_119-e/Docs/ R2-2207050.zip], 5 pages.
Dell Technologies—Ali Esswie et al. "Dynamic BSR formulation-and reporting for XR", 3GPP Draft; R2-2300256; 3GPP TSG-RAN WG2 Meeting #121, Athens, GR, Feb. 13, 2023 [https://www.3gpp.org/ftp/TSG_RAN/WG2_R L2/TSGR2_121/Docs/R2-2300256.zip] , 8 pages.
Dell Technologies—Ali Esswie et al. "BSR feedback enhancements for XR", 3GPP Draft; R2-2211275; Nov. 3, 2022. 3GPP TSG-RAN WG2 Meeting #120, Toulouse, France, [https://www.3gpp.org/ftp/TSG_RAN/WG2_R L2/TSGR2_120/Docs/R2-2211275.zip], 7 pages.
Notification concerning transmittal of International Preliminary Report on Patentability for PCT Application No. PCT/US2023/034357 mailed May 8, 2025, 14 pages.
European Office Action mailed Jun. 5, 2025 for European Patent Application No. 23800634.0, 3 pages.
Office Action mailed Jun. 18, 2025 for U.S. Appl. No. 17/975,988, 24 pages.
Notification concerning transmittal of International Preliminary Report on Patentability for PCT Application No. PCT/US2023/034358 mailed May 15, 2025, 10 pages.
European Office Action mailed Jun. 11, 2025 for European Patent Application No. 23794532.4, 3 pages.
Notice of Allowance mailed Jan. 14, 2026 for U.S. Appl. No. 17/975,988, 25 pages.

* cited by examiner

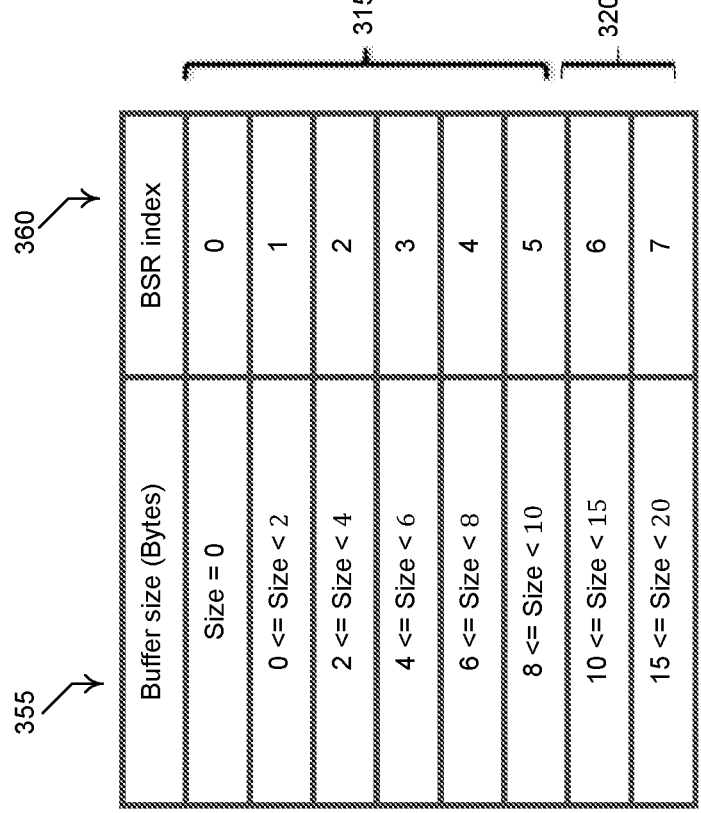
| Buffer size (Bytes) | BSR index |
|---|---|
| Size = 0 | 0 |
| 0 <= Size < 2 | 1 |
| 2 <= Size < 4 | 2 |
| 4 <= Size < 6 | 3 |
| 6 <= Size < 8 | 4 |
| 8 <= Size < 10 | 5 |
| 10 <= Size < 15 | 6 |
| 15 <= Size < 20 | 7 |
FIG. 3B

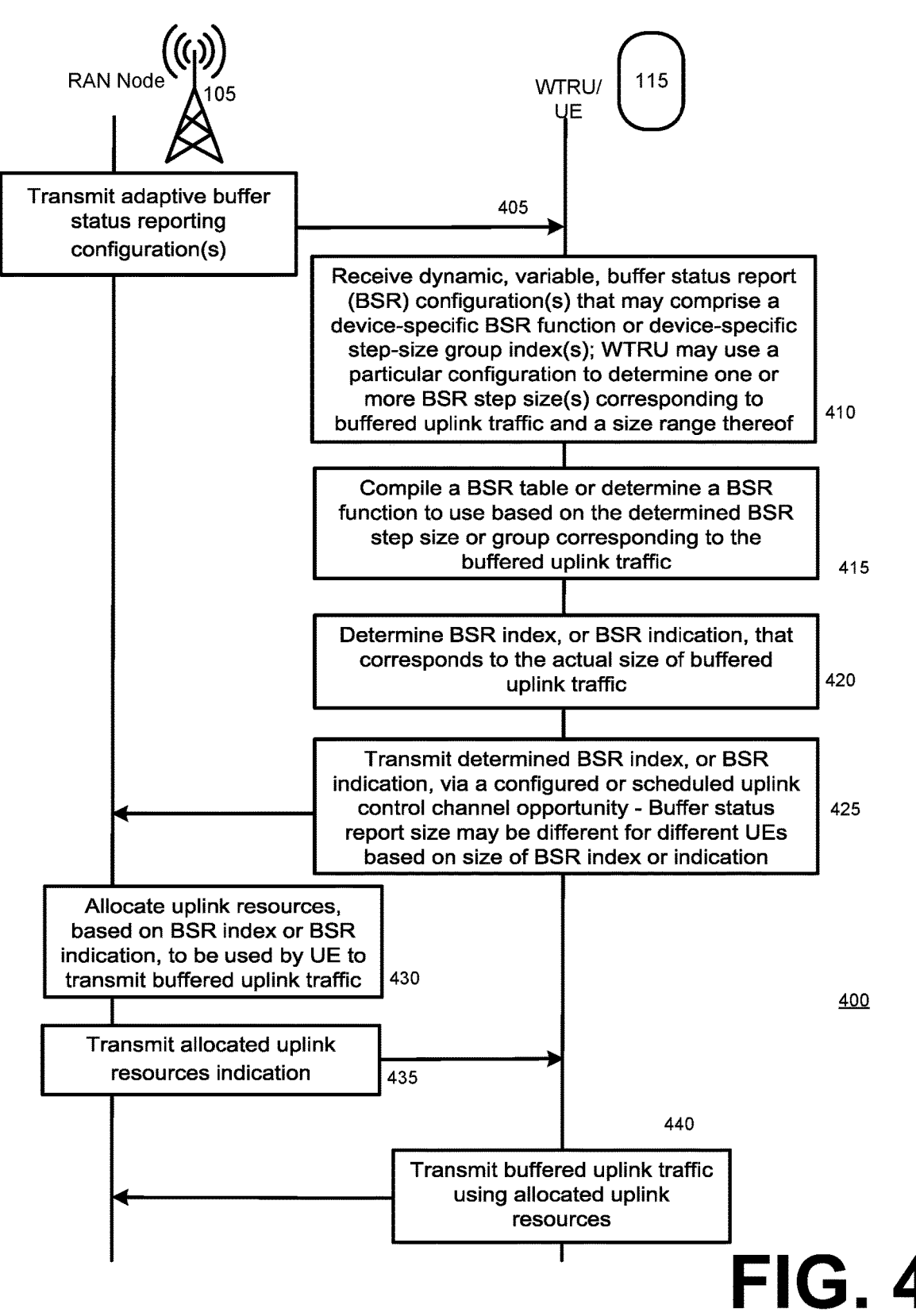

RAN Node 105

WTRU/UE 115

Transmit adaptive buffer status reporting configuration(s)

405

Receive dynamic, variable, buffer status report (BSR) configuration(s) that may comprise a device-specific BSR function or device-specific step-size group index(s); WTRU may use a particular configuration to determine one or more BSR step size(s) corresponding to buffered uplink traffic and a size range thereof

410

Compile a BSR table or determine a BSR function to use based on the determined BSR step size or group corresponding to the buffered uplink traffic

415

Determine BSR index, or BSR indication, that corresponds to the actual size of buffered uplink traffic

420

Transmit determined BSR index, or BSR indication, via a configured or scheduled uplink control channel opportunity - Buffer status report size may be different for different UEs based on size of BSR index or indication

425

Allocate uplink resources, based on BSR index or BSR indication, to be used by UE to transmit buffered uplink traffic   430

Transmit allocated uplink resources indication   435

440

Transmit buffered uplink traffic using allocated uplink resources

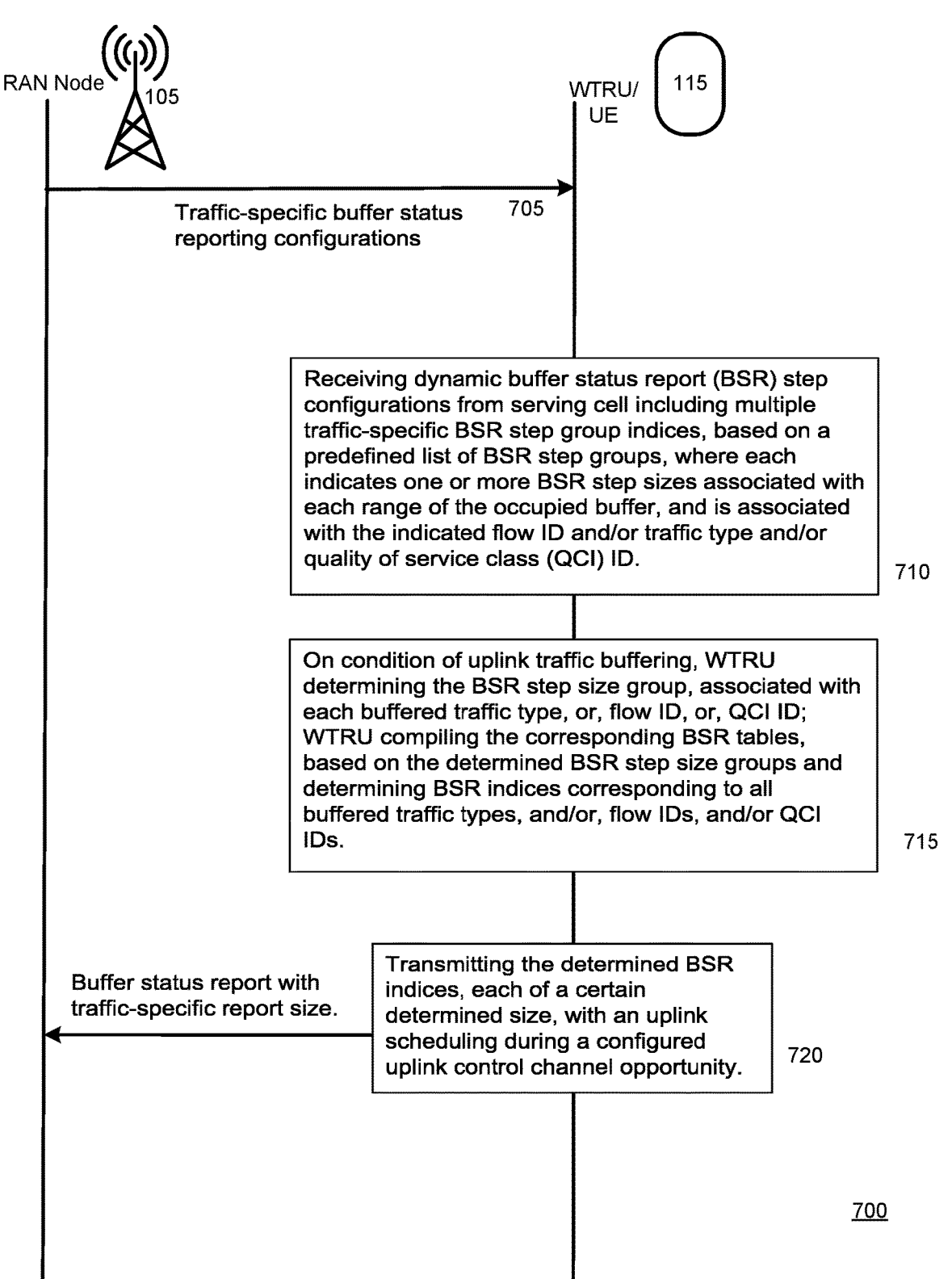

RAN Node 105

WTRU/ UE 115

Traffic-specific buffer status reporting configurations      705

Receiving dynamic buffer status report (BSR) step configurations from serving cell including multiple traffic-specific BSR step group indices, based on a predefined list of BSR step groups, where each indicates one or more BSR step sizes associated with each range of the occupied buffer, and is associated with the indicated flow ID and/or traffic type and/or quality of service class (QCI) ID.      710

On condition of uplink traffic buffering, WTRU determining the BSR step size group, associated with each buffered traffic type, or, flow ID, or, QCI ID; WTRU compiling the corresponding BSR tables, based on the determined BSR step size groups and determining BSR indices corresponding to all buffered traffic types, and/or, flow IDs, and/or QCI IDs.      715

Buffer status report with traffic-specific report size.

Transmitting the determined BSR indices, each of a certain determined size, with an uplink scheduling during a configured uplink control channel opportunity.      720

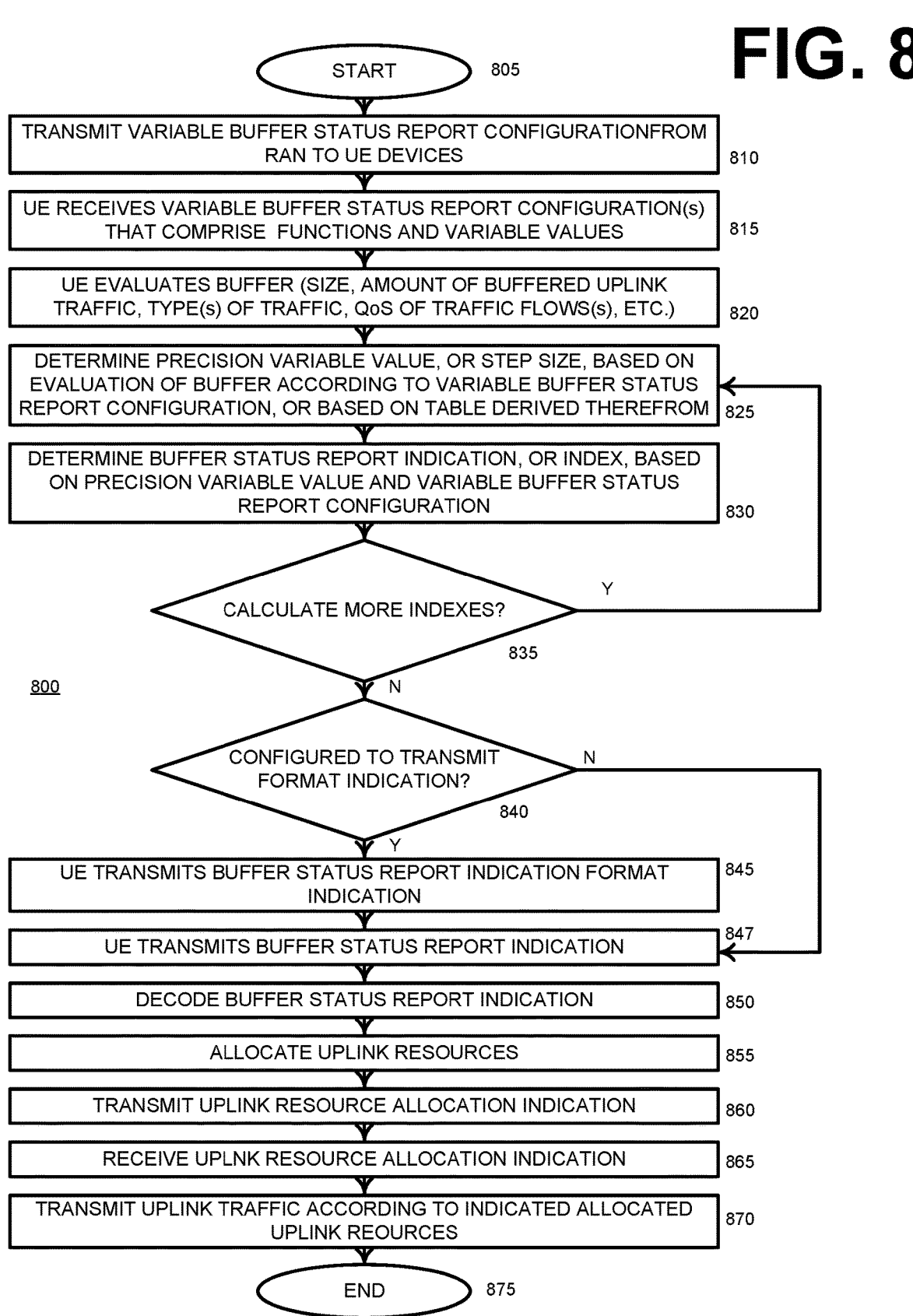

START — 805

TRANSMIT VARIABLE BUFFER STATUS REPORT CONFIGURATIONFROM RAN TO UE DEVICES — 810

UE RECEIVES VARIABLE BUFFER STATUS REPORT CONFIGURATION(s) THAT COMPRISE FUNCTIONS AND VARIABLE VALUES — 815

UE EVALUATES BUFFER (SIZE, AMOUNT OF BUFFERED UPLINK TRAFFIC, TYPE(s) OF TRAFFIC, QoS OF TRAFFIC FLOWS(s), ETC.) — 820

DETERMINE PRECISION VARIABLE VALUE, OR STEP SIZE, BASED ON EVALUATION OF BUFFER ACCORDING TO VARIABLE BUFFER STATUS REPORT CONFIGURATION, OR BASED ON TABLE DERIVED THEREFROM — 825

DETERMINE BUFFER STATUS REPORT INDICATION, OR INDEX, BASED ON PRECISION VARIABLE VALUE AND VARIABLE BUFFER STATUS REPORT CONFIGURATION — 830

CALCULATE MORE INDEXES? — 835     Y

800

N

CONFIGURED TO TRANSMIT FORMAT INDICATION? — 840     N

Y

UE TRANSMITS BUFFER STATUS REPORT INDICATION FORMAT INDICATION — 845

UE TRANSMITS BUFFER STATUS REPORT INDICATION — 847

DECODE BUFFER STATUS REPORT INDICATION — 850

ALLOCATE UPLINK RESOURCES — 855

TRANSMIT UPLINK RESOURCE ALLOCATION INDICATION — 860

RECEIVE UPLNK RESOURCE ALLOCATION INDICATION — 865

TRANSMIT UPLINK TRAFFIC ACCORDING TO INDICATED ALLOCATED UPLINK REOURCES — 870

END — 875

FIG. 9

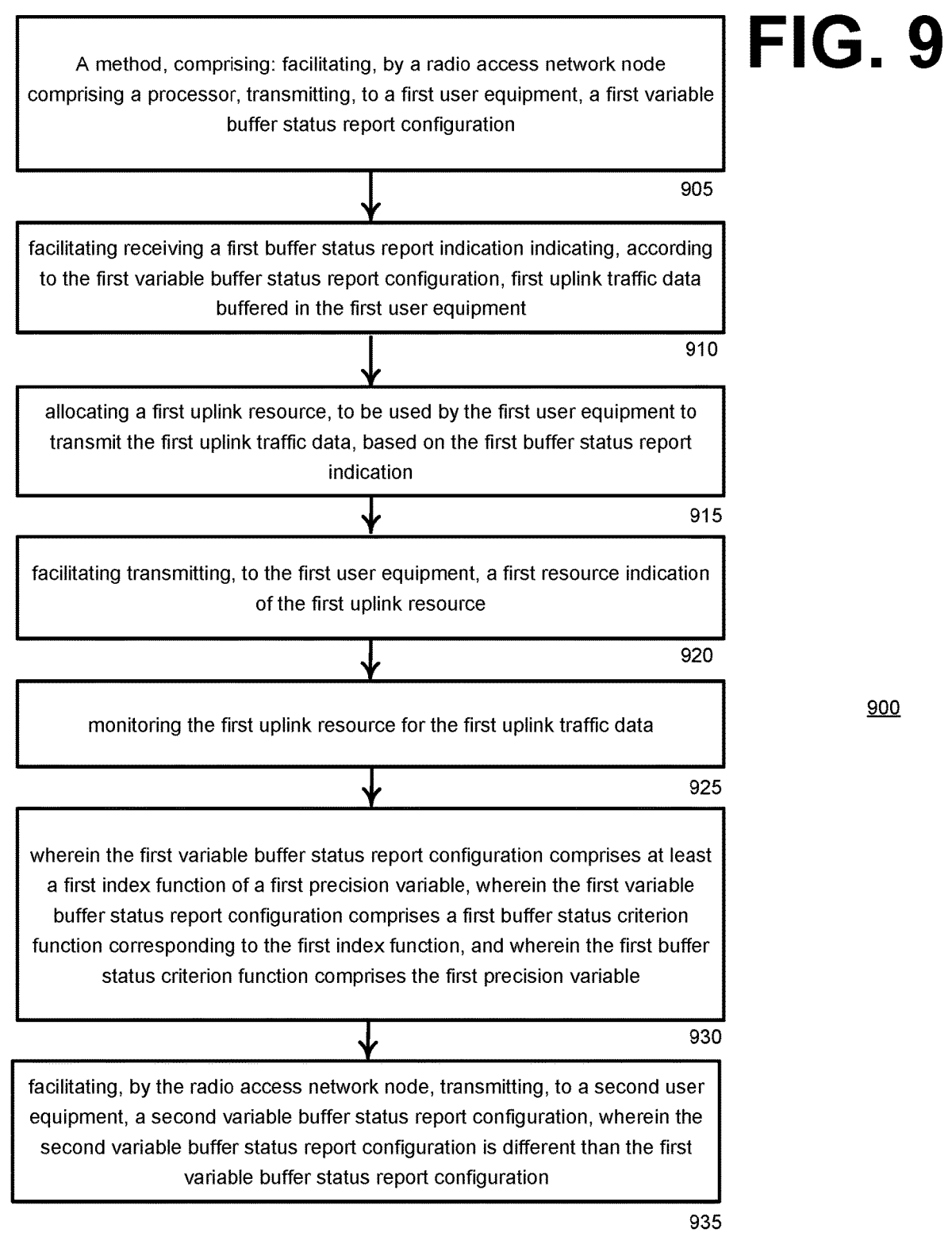

A method, comprising: facilitating, by a radio access network node comprising a processor, transmitting, to a first user equipment, a first variable buffer status report configuration

905 facilitating receiving a first buffer status report indication indicating, according to the first variable buffer status report configuration, first uplink traffic data buffered in the first user equipment

910 allocating a first uplink resource, to be used by the first user equipment to transmit the first uplink traffic data, based on the first buffer status report indication

915 facilitating transmitting, to the first user equipment, a first resource indication of the first uplink resource

920 monitoring the first uplink resource for the first uplink traffic data

925 wherein the first variable buffer status report configuration comprises at least a first index function of a first precision variable, wherein the first variable buffer status report configuration comprises a first buffer status criterion function corresponding to the first index function, and wherein the first buffer status criterion function comprises the first precision variable

930 facilitating, by the radio access network node, transmitting, to a second user equipment, a second variable buffer status report configuration, wherein the second variable buffer status report configuration is different than the first variable buffer status report configuration

935

900

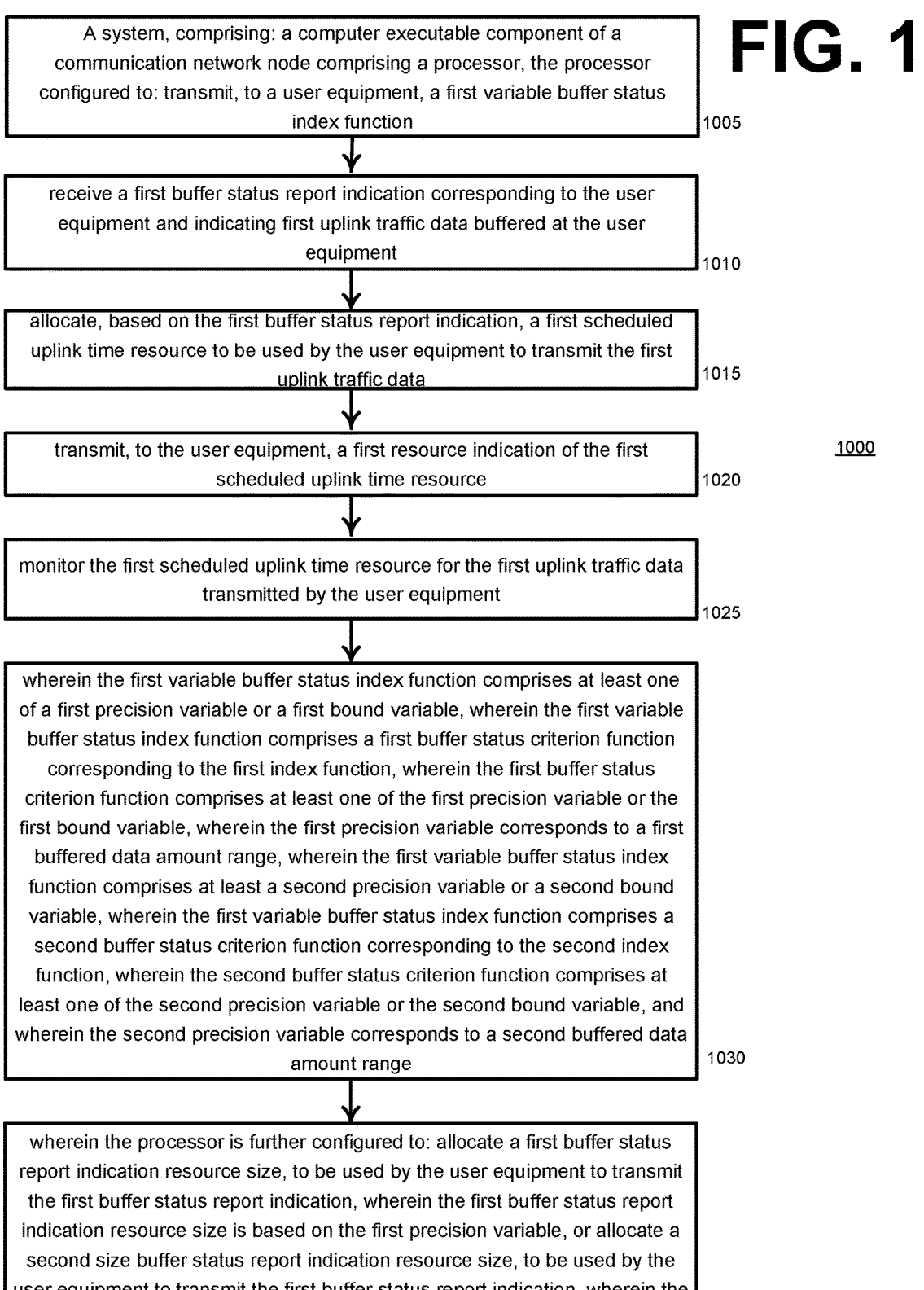

A system, comprising: a computer executable component of a communication network node comprising a processor, the processor configured to: transmit, to a user equipment, a first variable buffer status index function
1005 receive a first buffer status report indication corresponding to the user equipment and indicating first uplink traffic data buffered at the user equipment
1010 allocate, based on the first buffer status report indication, a first scheduled uplink time resource to be used by the user equipment to transmit the first uplink traffic data
1015 transmit, to the user equipment, a first resource indication of the first scheduled uplink time resource
1020 monitor the first scheduled uplink time resource for the first uplink traffic data transmitted by the user equipment
1025 wherein the first variable buffer status index function comprises at least one of a first precision variable or a first bound variable, wherein the first variable buffer status index function comprises a first buffer status criterion function corresponding to the first index function, wherein the first buffer status criterion function comprises at least one of the first precision variable or the first bound variable, wherein the first precision variable corresponds to a first buffered data amount range, wherein the first variable buffer status index function comprises at least a second precision variable or a second bound variable, wherein the first variable buffer status index function comprises a second buffer status criterion function corresponding to the second index function, wherein the second buffer status criterion function comprises at least one of the second precision variable or the second bound variable, and wherein the second precision variable corresponds to a second buffered data amount range
1030 wherein the processor is further configured to: allocate a first buffer status report indication resource size, to be used by the user equipment to transmit the first buffer status report indication, wherein the first buffer status report indication resource size is based on the first precision variable, or allocate a second size buffer status report indication resource size, to be used by the user equipment to transmit the first buffer status report indication, wherein the second size buffer status report indication resource size is based on the second precision variable
1035

FIG. 11

A non-transitory machine-readable medium, comprising executable instructions that, when executed by a processor of a node of a communication network, facilitate performance of operations, comprising: transmitting, to a first user equipment, a first variable buffer status report configuration

1105 transmitting, to a first user equipment, a first variable buffer status report configuration

1110 receiving a first buffer status report indication from the first user equipment and indicating, according to the first variable buffer status report configuration, first uplink traffic data buffered in the first user equipment

1115 allocating a first uplink time resource and a first uplink frequency resource, to be used by the first user equipment to transmit the first uplink traffic data, based on the first buffer status report indication

1120 transmitting, to the first user equipment, a first resource indication of the first uplink time resource and the first uplink frequency resource

1125 monitoring the first uplink time resource and the first uplink frequency resource for the first uplink traffic data transmitted by the first user equipment

1130 transmitting, to the first user equipment, a second variable buffer status report configuration

1135 receiving a second buffer status report indication corresponding to the first user equipment and indicating, according to the second variable buffer status report configuration, second uplink traffic data buffered in the first user equipment

1140 allocating a second uplink time resource and a second uplink frequency resource, to be used by the first user equipment to transmit the second uplink traffic data, based on the second buffer status report indication

1145 transmitting, to the first user equipment, a second resource indication of the second uplink time resource and the second uplink frequency resource

1150 monitoring the second uplink time resource and the second uplink frequency resource for the second uplink traffic data from the first user equipment

Figure 12:
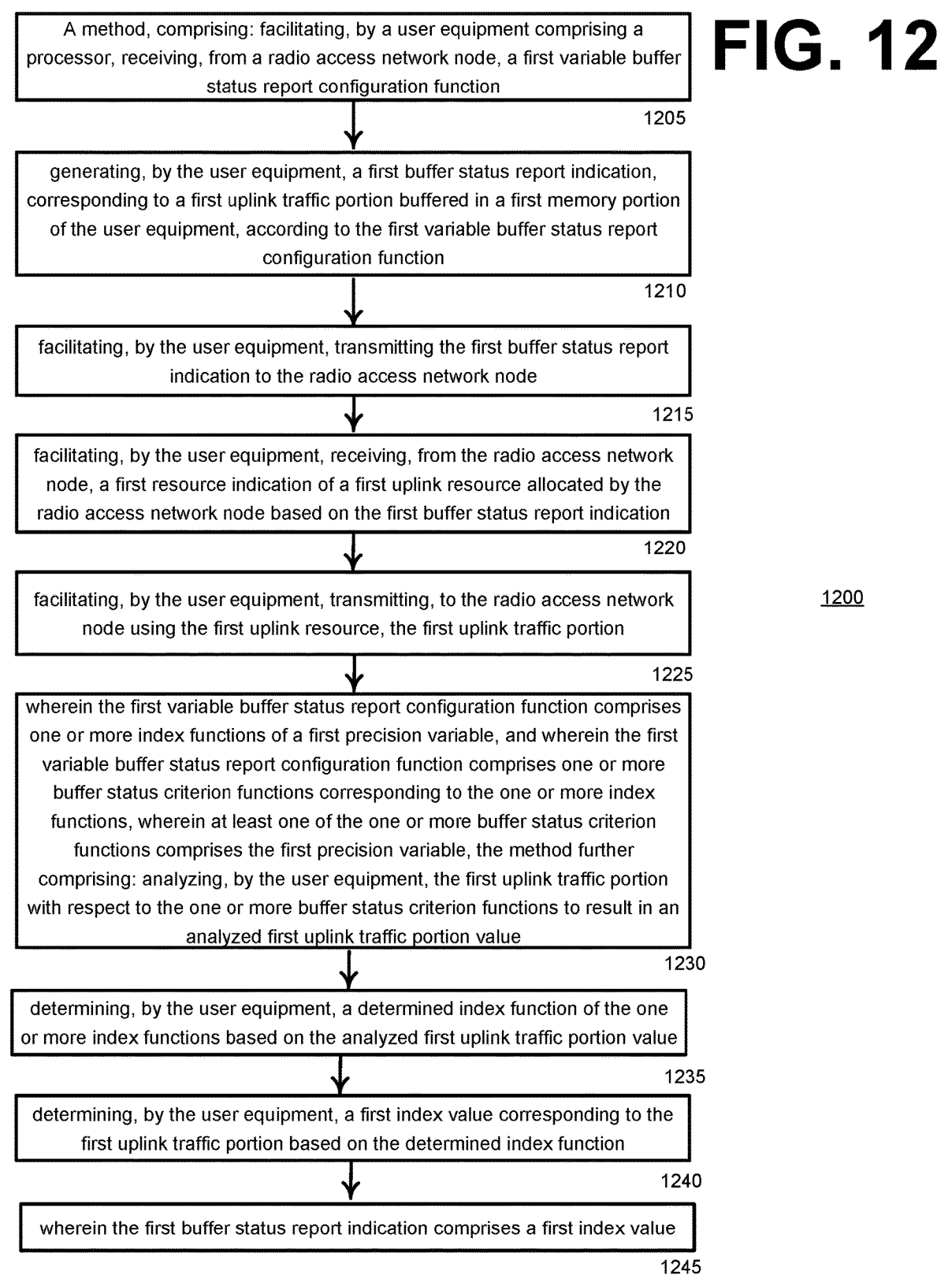

A method, comprising: facilitating, by a user equipment comprising a processor, receiving, from a radio access network node, a first variable buffer status report configuration function

1205 generating, by the user equipment, a first buffer status report indication, corresponding to a first uplink traffic portion buffered in a first memory portion of the user equipment, according to the first variable buffer status report configuration function

1210 facilitating, by the user equipment, transmitting the first buffer status report indication to the radio access network node

1215 facilitating, by the user equipment, receiving, from the radio access network node, a first resource indication of a first uplink resource allocated by the radio access network node based on the first buffer status report indication

1220 facilitating, by the user equipment, transmitting, to the radio access network node using the first uplink resource, the first uplink traffic portion

1225 wherein the first variable buffer status report configuration function comprises one or more index functions of a first precision variable, and wherein the first variable buffer status report configuration function comprises one or more buffer status criterion functions corresponding to the one or more index functions, wherein at least one of the one or more buffer status criterion functions comprises the first precision variable, the method further comprising: analyzing, by the user equipment, the first uplink traffic portion with respect to the one or more buffer status criterion functions to result in an analyzed first uplink traffic portion value

1230 determining, by the user equipment, a determined index function of the one or more index functions based on the analyzed first uplink traffic portion value

1235 determining, by the user equipment, a first index value corresponding to the first uplink traffic portion based on the determined index function

1240 wherein the first buffer status report indication comprises a first index value

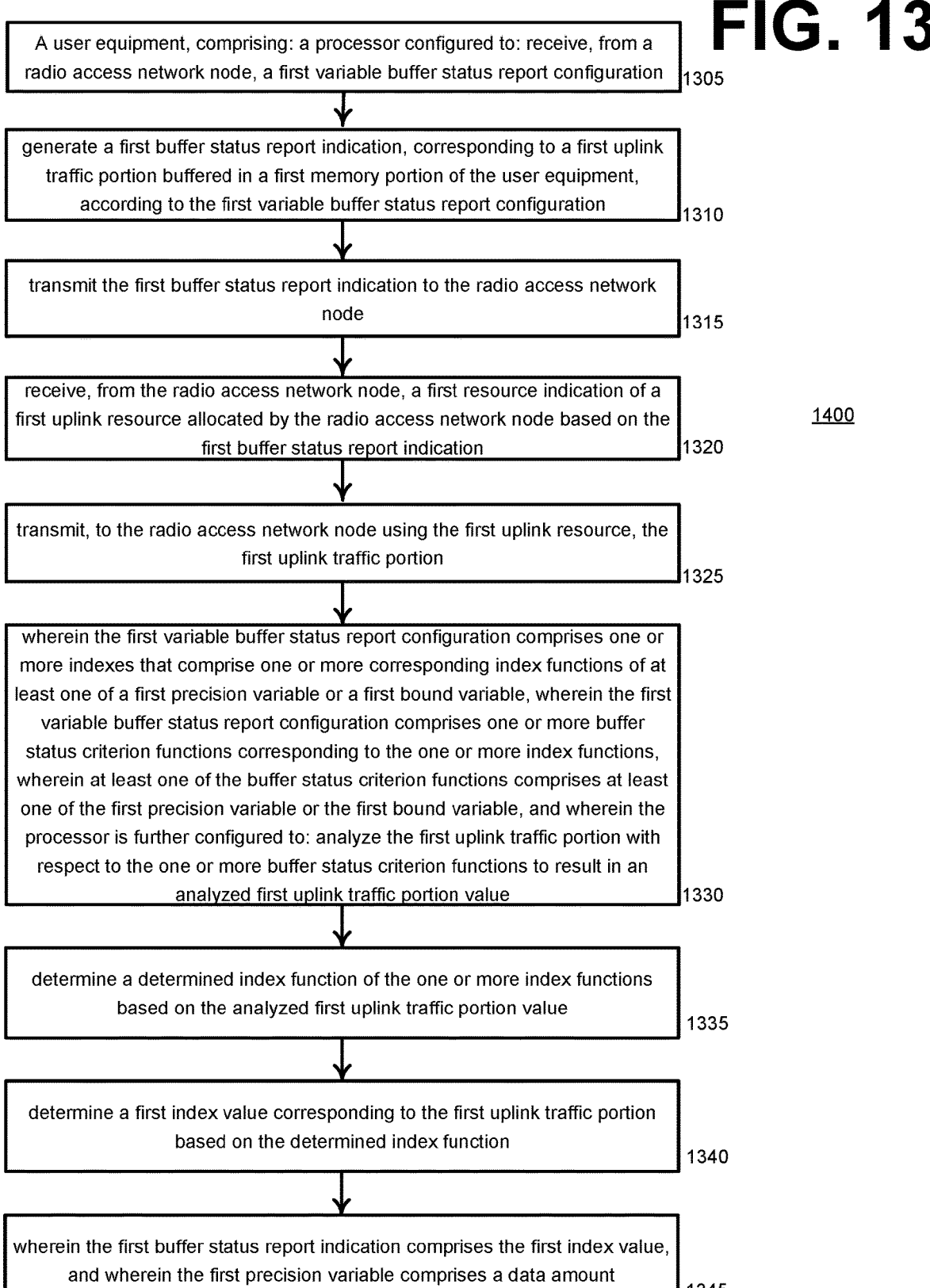

A user equipment, comprising: a processor configured to: receive, from a radio access network node, a first variable buffer status report configuration — 1305 generate a first buffer status report indication, corresponding to a first uplink traffic portion buffered in a first memory portion of the user equipment, according to the first variable buffer status report configuration — 1310 transmit the first buffer status report indication to the radio access network node — 1315 receive, from the radio access network node, a first resource indication of a first uplink resource allocated by the radio access network node based on the first buffer status report indication — 1320 transmit, to the radio access network node using the first uplink resource, the first uplink traffic portion — 1325 wherein the first variable buffer status report configuration comprises one or more indexes that comprise one or more corresponding index functions of at least one of a first precision variable or a first bound variable, wherein the first variable buffer status report configuration comprises one or more buffer status criterion functions corresponding to the one or more index functions, wherein at least one of the buffer status criterion functions comprises at least one of the first precision variable or the first bound variable, and wherein the processor is further configured to: analyze the first uplink traffic portion with respect to the one or more buffer status criterion functions to result in an analyzed first uplink traffic portion value — 1330 determine a determined index function of the one or more index functions based on the analyzed first uplink traffic portion value — 1335 determine a first index value corresponding to the first uplink traffic portion based on the determined index function — 1340 wherein the first buffer status report indication comprises the first index value, and wherein the first precision variable comprises a data amount — 1345

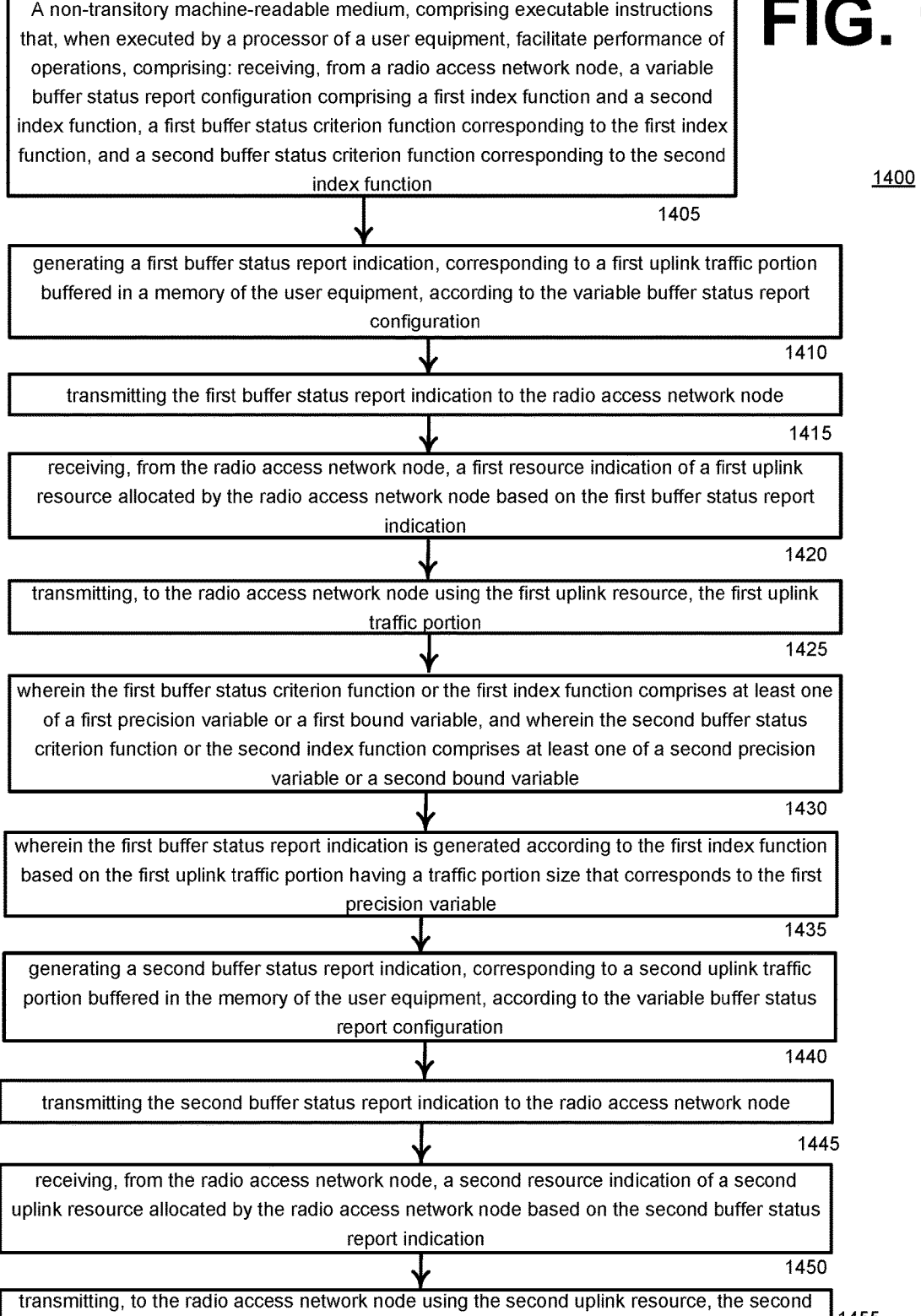

A non-transitory machine-readable medium, comprising executable instructions that, when executed by a processor of a user equipment, facilitate performance of operations, comprising: receiving, from a radio access network node, a variable buffer status report configuration comprising a first index function and a second index function, a first buffer status criterion function corresponding to the first index function, and a second buffer status criterion function corresponding to the second index function

1405 generating a first buffer status report indication, corresponding to a first uplink traffic portion buffered in a memory of the user equipment, according to the variable buffer status report configuration

1410 transmitting the first buffer status report indication to the radio access network node

1415 receiving, from the radio access network node, a first resource indication of a first uplink resource allocated by the radio access network node based on the first buffer status report indication

1420 transmitting, to the radio access network node using the first uplink resource, the first uplink traffic portion

1425 wherein the first buffer status criterion function or the first index function comprises at least one of a first precision variable or a first bound variable, and wherein the second buffer status criterion function or the second index function comprises at least one of a second precision variable or a second bound variable

1430 wherein the first buffer status report indication is generated according to the first index function based on the first uplink traffic portion having a traffic portion size that corresponds to the first precision variable

1435 generating a second buffer status report indication, corresponding to a second uplink traffic portion buffered in the memory of the user equipment, according to the variable buffer status report configuration

1440 transmitting the second buffer status report indication to the radio access network node

1445 receiving, from the radio access network node, a second resource indication of a second uplink resource allocated by the radio access network node based on the second buffer status report indication

1450 transmitting, to the radio access network node using the second uplink resource, the second uplink traffic portion

1455

1400

ADAPTIVE BUFFER STATUS REPORTING

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method comprises facilitating, by a radio access network node comprising a processor, transmitting, to a first user equipment, a first variable buffer status report configuration, which may comprise one or more functions, one or more, precision variables, or one or more precision variable values corresponding to one or size ranges. The method can further comprise facilitating receiving a first buffer status report indication indicating, according to the first variable buffer status report configuration, first uplink traffic data buffered in the first user equipment. The method can further comprise allocating a first uplink resource, to be used by the first user equipment to transmit the first uplink traffic data, based on the first buffer status report indication. The method can further comprise facilitating transmitting, to the first user equipment, a first resource indication of the first uplink resource; and monitoring the first uplink resource for the first uplink traffic data. The first buffer status report indication may be determined by the first user equipment based on applying a value corresponding to a determined metric of the first user equipment, such as, for example, an amount of buffered uplink traffic, a buffer size of the first user equipment, a traffic type of buffered uplink traffic, or other metric, to a function of the variable buffer status report configuration. The first user equipment may use the first variable buffer status report configuration to determine a custom buffer status report configuration, or a custom table with custom criteria, to various metrices, such as, buffer size, traffic size/amount, traffic type, device type, etc. Thus, the first user equipment may adapt the first variable buffer status configuration to current, real-time, or existential conditions, traffic, or metrices at the first user equipment. The same first buffer status report configuration can be used to result in the first user equipment determining different determined buffer status reports, or report indications, for a given amount of buffered uplink traffic, depending on changes, as determined by the first user equipment of different metrices, or parameter values pertaining to the first user equipment.

The first variable buffer status report configuration may comprise at least a first index function of a first precision variable, wherein the first variable buffer status report configuration comprises a first buffer status criterion function corresponding to the first index function, and wherein the first buffer status criterion function comprises the first precision variable. The first precision variable may comprise a step size variable and the first variable buffer status report configuration may comprise different values that are specific to the first user equipment to use in place of the first precision variable based on a metric determined by the first user equipment.

The first precision variable may comprise a first data amount. For example, the first variable buffer status report configuration may comprise a step size value to use for the first precision variable in a function of the buffer status report configuration based on a traffic size determined at the first user equipment.

The first variable buffer status report configuration may comprise at least a second index function of a second precision variable, wherein the first variable buffer status report configuration comprises a second buffer status criterion function corresponding to the second index function. The second buffer status criterion function can comprise the second precision variable, wherein the second precision variable comprises a second data amount (e.g., a value to use for a second range, or second type, of buffered uplink traffic). The first precision variable can be associated in the first variable buffer status report configuration with a first buffered traffic size range. Further, the second precision variable can be associated in the first variable buffer status report configuration with a second buffered traffic size range.

The example embodiment method may further comprise facilitating, by the radio access network node, transmitting, to the first user equipment, a second variable buffer status report configuration. The example method can further comprise facilitating receiving a second buffer status report indication corresponding to the first user equipment and indicating, according to the second variable buffer status report configuration, second uplink traffic data buffered in the first user equipment. The example method can further comprise allocating a second uplink resource, to be used by the first user equipment to transmit the second uplink traffic data, based on the second buffer status report indication. The example method can further comprise facilitating transmitting, to the first user equipment, a second resource indication of the second uplink resource. The example method can further comprise monitoring the second uplink resource for the second uplink traffic data transmitted by the first user equipment. The first variable buffer status report configuration corresponds to a first type of traffic and the second variable buffer status report configuration corresponds to a second type of traffic. Thus, a UE may determine a first buffer status report indication for a first type of uplink buffered traffic using the first variable buffer status report configuration, and the UE may determine a second buffer status report indication for a second type of uplink buffered traffic using the second variable buffer status report configuration. The second variable buffer status report configuration may comprise a second index that comprises a second index function of a second precision variable, wherein the second variable buffer status report configuration comprises a second buffer status criterion function corresponding to the second index function, and wherein the second buffer status criterion function comprises the second precision variable.

The first precision variable corresponds to a first type of traffic and the second precision variable may correspond to a second type of traffic. The first type of traffic may correspond to a first quality of service and the second type of traffic corresponds to a second quality of service.

The first buffer status report indication may comprise a first index value (which the first user equipment may calculate, derive, or otherwise determine by determining a metric of the user equipment and applying the metric to the first buffer status report configuration, or a function contained therein), and the allocating of the first uplink resource may comprise determining, by the radio access network node, the first uplink resource based on the first index value. The first uplink resource may comprise a timing occasion, or occasions, or a frequency, or frequencies, to be used by the first user equipment to transmit buffer uplink traffic corresponding to the first buffer status report indication.

The example embodiment method may further comprise facilitating, by the radio access network node, transmitting, to a second user equipment, a second variable buffer status report configuration, wherein the second variable buffer status report configuration is different than the first variable buffer status report configuration. Thus, different user equipment may receive different variable buffer status report configurations.

An example embodiment system may comprise a computer executable component of a communication network node comprising a processor, the processor configured to: transmit, to a user equipment, a first variable buffer status index function and receive a first buffer status report indication corresponding to the user equipment and indicating first uplink traffic data buffered at the user equipment (the first buffer status report indication may be generated by the user equipment based on the first variable buffer status index function). The processor can be configured to allocate, based on the first buffer status report indication, a first scheduled uplink time resource to be used by the user equipment to transmit the first uplink traffic data. The processor can be configured to transmit, to the user equipment, a first resource indication of the first scheduled uplink time resource; and monitor the first scheduled uplink time resource for the first uplink traffic data transmitted by the user equipment.

The first variable buffer status index function comprises at least one of a first precision variable or a first bound variable, wherein the first variable buffer status index function comprises a first buffer status criterion function corresponding to the first index function, wherein the first buffer status criterion function comprises at least one of the first precision variable or the first bound variable, wherein the first precision variable corresponds to a first buffered data amount range, wherein the first variable buffer status index function comprises at least a second precision variable or a second bound variable, wherein the first variable buffer status index function comprises a second buffer status criterion function corresponding to the second index function, wherein the second buffer status criterion function comprises at least one of the second precision variable or the second bound variable, and wherein the second precision variable corresponds to a second buffered data amount range.

The processor of the computer executable component of a communication network node may be further configured to allocate a first buffer status report indication resource size, to be used by the user equipment to transmit the first buffer status report indication, wherein the first buffer status report indication resource size is based on the first precision variable, or allocate a second size buffer status report indication resource size, to be used by the user equipment to transmit the first buffer status report indication, wherein the second size buffer status report indication resource size is based on the second precision variable.

The processor of the example embodiment system may be further configured to transmit a second variable buffer status index function and receive a second buffer status report indication corresponding to the user equipment and indicating second uplink traffic data buffered in the user equipment (the second buffer status report indication may be generated by the user equipment based on the second variable buffer status index function). The processor can be configured to allocate, based on the second buffer status report indication, a second scheduled uplink time resource to be used by the user equipment to transmit the second uplink traffic data. The processor can be configured to transmit, to the user equipment, a second resource indication of the second scheduled uplink time resource, The processor can be configured to monitor the second scheduled uplink time resource for the second uplink traffic data transmitted by the user equipment, wherein the first variable buffer status index function corresponds to a first type of traffic, and the second variable buffer status index function corresponds to a second type of traffic. The first variable buffer status index function can comprise a first index function of a first precision variable, and the first variable buffer status index function comprises a first buffer status criterion function corresponding to the first index function. The second variable buffer status index function can comprise a second index function of a second precision variable, and the second variable buffer status index function comprises a second buffer status criterion function corresponding to the second index function. Further, the first precision variable can correspond to the first type of traffic, and the second precision variable can correspond to the second type of traffic.

In an example embodiment, a non-transitory machine-readable medium may comprise executable instructions that, when executed by a processor of a node of a communication network, facilitate performance of operations, comprising: transmitting, to a first user equipment, a first variable buffer status report configuration and receiving a first buffer status report indication from the first user equipment and indicating, according to the first variable buffer status report configuration, first uplink traffic data buffered in the first user equipment. The operations can comprise allocating a first uplink time resource and a first uplink frequency resource, to be used by the first user equipment to transmit the first uplink traffic data, based on the first buffer status report indication. The operations can comprise transmitting, to the first user equipment, a first resource indication of the first uplink time resource and the first uplink frequency resource. The operations can further comprise monitoring the first uplink time resource and the first uplink frequency resource for the first uplink traffic data transmitted by the first user equipment.

In an embodiment, the operations may further comprise transmitting, to the first user equipment, a second variable buffer status report configuration and receiving a second buffer status report indication corresponding to the first user equipment and indicating, according to the second variable buffer status report configuration, second uplink traffic data buffered in the first user equipment. The operations can comprise allocating a second uplink time resource and a second uplink frequency resource, to be used by the first user equipment to transmit the second uplink traffic data, based on the second buffer status report indication. The operations can comprise transmitting, to the first user equipment, a second resource indication of the second uplink time resource and the second uplink frequency resource. The operations can further comprise monitoring the second uplink time resource and the second uplink frequency resource for the second uplink traffic data from the first user equipment.

In an embodiment, the operations may further comprise transmitting, to a second user equipment, a third variable buffer status report configuration, wherein the third variable buffer status report configuration is different from the first variable buffer status report configuration or the second variable buffer status report configuration. The first variable buffer status report configuration comprises a first precision variable, and the third variable buffer status report configuration comprises a third precision variable. Further, the first precision variable and the third precision variable can correspond to a first equipment class of the first user equipment and to a second equipment class of the second user equipment, respectively. The operations may further comprise allocating a first size uplink resource to be used by the first user equipment to transmit the first buffer status report indication, wherein the size uplink resource is based on the first precision variable. The operations can further comprise allocating a second size uplink resource to be used by the second user equipment to transmit a third buffer status report indication, wherein the second size uplink resource is based on the third precision variable.

Another example embodiment, from the perspective of a user equipment, may comprise facilitating, by a user equipment comprising a processor, receiving, from a radio access network node, a first variable buffer status report configuration function; generating, by the user equipment, a first buffer status report indication, corresponding to a first uplink traffic portion (e.g., packets of a first uplink traffic flow) buffered in a first memory portion of the user equipment, according to the first variable buffer status report configuration function. The example method can comprise facilitating, by the user equipment, transmitting the first buffer status report indication to the radio access network node. The example method can comprise facilitating, by the user equipment, receiving, from the radio access network node, a first resource indication of a first uplink resource allocated by the radio access network node based on the first buffer status report indication. The example method can further comprise facilitating, by the user equipment, transmitting, to the radio access network node using the first uplink resource, the first uplink traffic portion.

In an embodiment, the first variable buffer status report configuration function may comprise one or more index functions of a first precision variable, and the first variable buffer status report configuration function may comprise one or more buffer status criterion functions corresponding to the one or more index functions, wherein at least one of the one or more buffer status criterion functions comprises the first precision variable. The example embodiment method may further comprise analyzing, by the user equipment, the first uplink traffic portion with respect to the one or more buffer status criterion functions to result in an analyzed first uplink traffic portion value. The example method can comprise determining, by the user equipment, a determined index function of the one or more index functions based on the analyzed first uplink traffic portion value. The example method can further comprise determining, by the user equipment, a first index value corresponding to the first uplink traffic portion based on the determined index function, wherein the first buffer status report indication comprises a first index value. The first precision variable may comprise, or may be replaced by, a configured data amount, such as a step size in terms of Bytes.

The user equipment-centric example method embodiment may further comprise facilitating, by the user equipment, receiving, from the radio access network node, a second variable buffer status report configuration function. The example method can comprise generating, by the user equipment, a second buffer status report indication, corresponding to a second uplink traffic portion buffered in a second memory portion of the user equipment, according to the second variable buffer status report configuration function. The example method can comprise facilitating, by the user equipment, transmitting the second buffer status report indication to the radio access network node. The example method can comprise facilitating, by the user equipment, receiving, from the radio access network node, a second resource indication of a second uplink resource allocated by the radio access network node based on the second buffer status report indication. The example method can further comprise facilitating, by the user equipment, transmitting, to the radio access network node using the second uplink resource, the second uplink traffic portion.

The first precision variable may correspond to a first uplink traffic type of the first uplink traffic portion, and the second precision variable correspond to a second uplink traffic type of the second uplink traffic portion. The user equipment may determine the first uplink traffic type and associate the first precision variable, or a value corresponding thereto, with the first uplink traffic type and the user equipment may determine the second uplink traffic type and associate the second precision variable, or a value corresponding thereto, with the second uplink traffic type. The first uplink traffic type may correspond to a configured first quality of service, and the second uplink traffic type may correspond to a configured second quality of service. The first uplink traffic type may correspond to a determined first quality of service, and the second uplink traffic type may correspond to a determined second quality of service, wherein the user equipment analyzes the first and second uplink traffic types to determine the respective Qualities of Service thereof.

The first index value may be generated based on the first precision variable or based on a value associated therewith in the first buffer status report configuration function. The second buffer status report indication may comprise a second index value, and the second index value may be generated based on the second precision variable or based on a value associated therewith in the first buffer status report configuration function.

In another example embodiment, a user equipment may comprise a processor configured to: receive, from a radio access network node, a first variable buffer status report configuration; generate a first buffer status report indication, corresponding to a first uplink traffic portion buffered in a first memory portion of the user equipment, according to the first variable buffer status report configuration. The processor can be configured to transmit the first buffer status report indication to the radio access network node; receive, from the radio access network node, a first resource indication of a first uplink resource allocated by the radio access network node based on the first buffer status report indication. The processor can be further configured to transmit, to the radio access network node using the first uplink resource, the first uplink traffic portion.

The first variable buffer status report configuration may comprise one or more indexes that comprise one or more corresponding index functions of at least one of a first precision variable or a first bound variable, wherein the first variable buffer status report configuration may comprise one or more buffer status criterion functions corresponding to the one or more index functions. In this regard, at least one of the buffer status criterion functions may comprise at least one of the first precision variable or the first bound variable. The processor can be further configured to: analyze the first uplink traffic portion with respect to the one or more buffer status criterion functions to result in an analyzed first uplink traffic portion value and determine a determined index function of the one or more index functions based on the analyzed first uplink traffic portion value. The processor can be further configured to determine a first index value corresponding to the first uplink traffic portion based on the determined index function, wherein the first buffer status report indication comprises the first index value, and wherein the first precision variable comprises a data amount.

The data amount of the first precision variable may correspond to a memory size of the first memory portion. The data amount of the first precision variable corresponds to a traffic size of the first uplink traffic portion buffered in the first memory portion.

The processor of the user equipment be further configured to: receive from the radio access network node, a second variable buffer status report configuration and generate a second buffer status report indication, corresponding to a second uplink traffic portion buffered in a second memory portion of the user equipment, according to the second variable buffer status report configuration. The processor can be further configured to transmit the second buffer status report indication to the radio access network node and receive, from the radio access network node, a second resource indication of a second uplink resource allocated by the radio access network node based on the second buffer status report indication. Further, the processor can be configured to transmit, to the radio access network node using the second uplink resource, the second uplink traffic portion, wherein the first precision variable corresponds to a first uplink traffic type, and a second precision variable corresponds to a second uplink traffic type. The first uplink traffic type can correspond to a first quality of service, and the second uplink traffic type can correspond to a second quality of service. The first index value can be generated based on the determined index function, and the first precision variable or the first bound variable. Further, a second index value can be generated based on a second index function of the second buffer status report configuration, and a second precision variable or a second bound variable of the second variable buffer status report configuration.

In an embodiment, the data amount of the first precision variable may correspond to a traffic size of the first uplink traffic portion buffered in the first memory portion.

In another embodiment, a non-transitory machine-readable medium, comprising executable instructions that, when executed by a processor of a user equipment, facilitate performance of operations, comprising: receiving, from a radio access network node, a variable buffer status report configuration comprising a first index function and a second index function, a first buffer status criterion function corresponding to the first index function, and a second buffer status criterion function corresponding to the second index function; generating a first buffer status report indication, corresponding to a first uplink traffic portion buffered in a memory of the user equipment, according to the variable buffer status report configuration. The operations can further comprise transmitting the first buffer status report indication to the radio access network node. The operations can further comprise receiving, from the radio access network node, a first resource indication of a first uplink resource allocated by the radio access network node based on the first buffer status report indication. The operations can further comprise transmitting, to the radio access network node using the first uplink resource, the first uplink traffic portion.

The first buffer status criterion function or the first index function may comprise at least one of a first precision variable or a first bound variable, and wherein the second buffer status criterion function or the second index function may comprise at least one of a second precision variable or a second bound variable.

The first buffer status report indication may be generated according to the first index function based on the first uplink traffic portion having a traffic portion size that corresponds to the first precision variable, or a configure value corresponding to the first precision variable.

The first buffer status report indication may be generated according to the second index function based on the first uplink traffic portion having a traffic portion size that corresponds to the second precision variable.

The operations may further comprise generating a second buffer status report indication, corresponding to a second uplink traffic portion buffered in the memory of the user equipment, according to the variable buffer status report configuration. The operations can further comprise transmitting the second buffer status report indication to the radio access network node and receiving, from the radio access network node, a second resource indication of a second uplink resource allocated by the radio access network node based on the second buffer status report indication. The operations can further comprise transmitting, to the radio access network node using the second uplink resource, the second uplink traffic portion. The first uplink traffic portion may correspond to a first type of traffic, the second uplink traffic portion may correspond to a second type of traffic, the first precision variable, or a configured value associated therewith, may corresponds to the first type of traffic, the second precision variable, or a configured value associated therewith, may correspond to the second type of traffic. Further, the first buffer status report indication may be generated according to the first index function and the first buffer status criterion function, and the second buffer status report indication may be generated according to the second index function and the second buffer status criterion function.

BRIEF DESCRIPTION OF THE DRAWINGS

FIG. 3B illustrates an example table the is determined from a variable buffer status report configuration.

FIG. 4 illustrates a timing diagram of an example method embodiment to configure and use a variable buffer status report configuration.

FIG. 7 illustrates a timing diagram of an example method to configure UEs to use traffic-specific, or device-type-specific, variable buffer status report configurations.

FIG. 8 illustrates a flow diagram of an example method to configure UEs to use a variable buffer status report configuration.

FIG. 9 illustrates a block diagram of an example method.

FIG. 10 illustrates a block diagram of an example user equipment.

FIG. 11 illustrates a block diagram of an example non-transitory machine-readable medium.

FIG. 12 illustrates a block diagram of an example method.

FIG. 13 illustrates a block diagram of an example user equipment.

FIG. 14 illustrates a block diagram of an example non-transitory machine-readable medium.

DETAILED DESCRIPTION OF THE DRAWINGS

Figure 1:
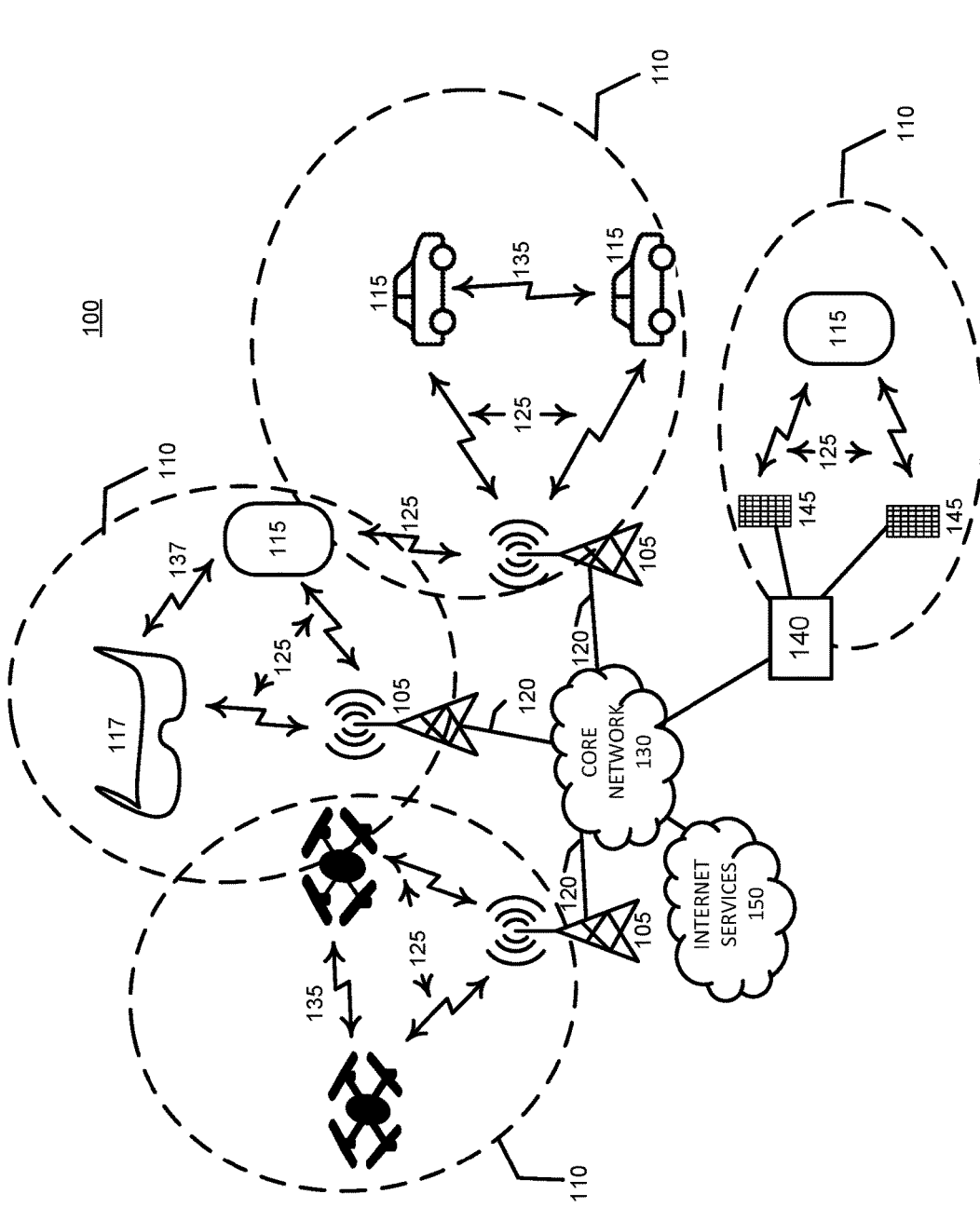
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

The PDCCH of a 5G NR system may deliver downlink and uplink control information to cellular devices. Compared to the control channel design of the fourth generation (e.g., LTE), the 5G control channel can match requirements of the URLLC and eMBB use cases and can offer an efficient coexistence between those different QoS classes.

The 5G PDCCH channel, unlike the Fourth Generation control channel, may be beamformed using favored-channel vectors of each UE, with embedded demodulation-assisting demodulation reference signals ("DMRS"). The PDCCH may be modulated by a fixed QPSK modulation scheme and with a conservative coding rate such as the reliability of receiving the PDCCH channel at a UE device is maximized. For example, to satisfy a URLLC 10e-5 reliability level, the PDCCH channel decoding ability may be enhanced at the device end.

The resource size of each PDCCH channel, which may be carrying the downlink control information ("DCI") of one or more UEs, may be time-varying, and may be referred to as PDCCH aggregation level. In particular, and to enhance PDCCH decoding, the network may increase the resource size of the PDCCH channel and accordingly adopt a more conservative and resource-less-efficient coding rate of the PDCCH. This implies that same amount of PDCCH control information is transmitted with a stronger coding rate (i.e., more redundant bits for error detection and correction) at the expense of consuming more channel resources for transmitting the PDCCH information.

There are two types of PDCCH channels. First, the UE-specific PDCCH, where a set channel resources are periodically monitored by a single UE/device. After being configured, the device will attempt to blindly decode those candidate resources in case they may be potentially carrying DCI information. This DCI information includes configurations on scheduled uplink or downlink grants, transmission configurations, and information on common system signaling and updates. Furthermore, the blind decoding is the process when the UE attempts decoding the DCI with all possible transmission configurations and aggregation levels. This implies a heavy power consumption on the device end; however, it is necessary because the UE is not yet aware about the actual configurations of the PDCCH channel and corresponding transmissions. It shall be aware of such after it successfully decodes the PDCCH. In the active mode, the UE may monitor the configured one or more PDCCH search spaces, where a search space implies a set of candidate resources that may carry the PDCCH/DCI information. The search space definitions may be used to refer to varying size of the PDCCH channel (i.e., aggregation levels) and hence, the required size of resources to carry the PDCCH may vary.

Common PDCCH search spaces are monitored by all UEs. Those common PDCCH channels typically carry DCI information that are relevant to all devices. Examples include system updates and control information, all-UE power control information, and general system information.

For each scheduled downlink or uplink transmission, there typically is a preceding PDCCH control transmission informing the UE device about resources scheduled by the network for the transmission, and transmission configurations to use for transmission in the uplink or reception in the downlink. Accordingly, the PDCCH transmissions are considered as signaling overhead, which should be always minimized, and needed for successful device transmission and/or reception.

As an example use case that illustrates example embodiments disclosed herein, Virtual Reality ("VR") applications and VR variants, (e.g., mixed and augmented reality) may at some time perform best when using NR radio resources associated with URLLC while at other times lower performance levels may suffice. A virtual reality smart glass device may consume NR radio resources at a given broadband data rate having more stringent radio latency and reliability criteria to provide a satisfactory end-user experience.

5G systems should support 'anything reality' ("XR") services. XR services may comprise VR applications, which are widely adopted XR applications that provide an immersive environment which can stimulate the senses of an end user such that he, or she, may be 'tricked' into the feeling of being within a different environment than he, or she, is actually in. XR services may comprise Augmented Reality ('AR') applications that may enhance a real-world environment by providing additional virtual world elements via a user's senses that focus on real-world elements in the user's actual surrounding environment. XR services may comprise Mixed reality cases ("MR") applications that help merge, or bring together, virtual and real worlds such that an end-user of XR services interacts with elements of his, or her, real environment and virtual environment simultaneously.

Different XR use cases may be associated with certain radio performance targets. Common to XR cases, and unlike URLLC or eMBB, high-capacity links with stringent radio and reliability levels are typically needed for a satisfactory end user experience. For instance, compared to 5 Mbps URLLC link with a 1 ms radio budget, some XR applications need 100 Mbps links with couple of milliseconds of the allowed radio latency. Thus, 5G radio design and associated procedures may be adapt to the new XR QoS class and associated targets.

XR service may be facilitated by traffic having certain characteristics associated with the XR service. For example, XR traffic may typically be periodic with time-varying packet size and packet arrival rate. In addition, different packet traffic flows of a single XR session may affect an end user's experience differently. For instance, a smart glass that is streaming 180-degree high-resolution frames may use a large percentage of a broadband service's capacity for fulfilling user experience. However, frames that are to be presented to a user's pose direction (e.g., front direction) are the most vital for an end user's satisfactory user experience while frames to be presented to a user's periphery vision have less of an impact on a user's experience and thus may be associated with a lower QoS requirement for transport of traffic packets as compared to a QoS requirement for transporting the pose-direction traffic flow. Therefore, flow differentiation that prioritizes some flows, or some packets of a XR session over other flows or packets may facilitate efficient use of a communication system's capacity to deliver the traffic. Furthermore, XR capable devices (e.g., smart glasses, projection wearables, etc.) may be more power-limited than conventional mobile handsets due to the limited form factor of the devices. Thus, techniques to maximize power saving operation at XR capable device is desirable. Accordingly, a user equipment device accessing XR services, or traffic flows of an XR session, may be associated with certain QoS metrics to satisfy performance targets of the XR service in terms of perceived data rate or end to end latency and reliability, for example.

A user equipment device ("UE") with uplink traffic to be transmitted may transmit an uplink scheduling request ("SW") over an uplink control channel between the user equipment and a radio access network node ("RAN") that is serving the UE after establishing an initial connection with the network RAN. The SR transmission indicates to the RAN node vital information, such as the availability of uplink traffic at the device side so that the RAN can accordingly allocate a set of the available uplink resources that are appropriate to the UE for the uplink traffic to be transmitted therefrom. However, the network/RAN needs to be aware of the size, or amount, of the uplink traffic to be transmitted by the UE to allocate a suitable amount of uplink resources (e.g., scheduled uplink transmission occasions at a certain periodicity and at a certain frequency or within a certain frequency range). A buffer status report ("BSR") transmitted from the UE to a RAN may convey to the RAN an amount of traffic to be transmitted by the UE.

Conventionally, a BSR report is transmitted from UE devices towards serving base stations (e.g., RANs), which BSR report includes information indicating a size, or amount, of uplink traffic buffered at devices. Buffer status reporting from devices towards serving cells, is important, since BSR reports indicate to a serving RAN the current buffered uplink traffic size of each device, and accordingly, the network can efficiently allocate the appropriate size of the uplink resources for those uplink traffic transmissions. To reduce the BSR reporting overhead (since it is needed for every uplink transmission), several buffered traffic size ranges are defined, where each is associated with a BSR integer index. Thus, devoices may only transmit a BSR index that corresponds to the traffic range for which their buffered traffic size lies within.

To reduce the amount of BSR reporting overhead (e.g., uplink resources used for buffer status reporting instead of being used to transmit actual uplink traffic packets), the exact size of buffered uplink traffic is quantized into several predefined/configured size ranges and/or levels. Thus, a table of predefined BSR size ranges and associated BSR indexes is defined and configured in UE device, where each BSR index corresponds to a certain BSR range, (e.g., a certain size, or amount, of buffered uplink traffic in terms of bytes, for example).

The problem, however, is the quantization step size between two successive buffered traffic size ranges where is represented by a BSR index. Step sizes may be predefined and hard coded in fixed BSR tables that are broadcasted to all devices, where the step size is non-uniform. That is, a smaller fixed step size is used for smaller buffered traffic ranges and a larger step size is used for the larger traffic ranges. For instance, a single BSR index can indicate a buffered traffic range from 240 k bytes to 300 k bytes.

Spacing between the different quantization levels is typically non-uniform and is predefined, for example, a small quantization step size is used for ranges of smaller amounts of buffered uplink traffic and a larger step size may be used for ranges of larger amounts of buffered uplink traffic. Accordingly, conventional BSR reporting only includes an index from the table that corresponds to the current size of uplink traffic, which typically leads to a reduction in reporting overhead since an index value may comprise fewer bytes to be transmitted in an uplink reporting message than a number of bytes that may be used to transmit a value of an actual size of buffered uplink traffic.

However, due to the low resolution/low precision/coarseness of using large defined and configured step size values for large amounts of buffered uplink traffic at a UE, a RAN that receives a BSR based on a hard-coded range in a table stored on a UE may result in a RAN allocating enough uplink resources to accommodate an amount of uplink traffic buffered in a UE that is at the maximum value of a range even if the actual amount of buffered uplink traffic is at or near the low end of the configured hard-coded range that is associated with the BSR indication sent from the UE to the RAN. With extreme capacity and latency demanding 5G use cases, such as URLLC, VR, AR, etc., this may lead to extended scheduling latency and degraded network capacity. Because a network/RAN is not made aware of a refined/close-to-exact buffered traffic size of a UE device, the RAN may allocate a more-than-needed amount, or in some cases a less-than-needed amount of resources, for buffered uplink traffic. Accordingly, this results in allocation of uplink resources for non-existing uplink traffic, or scheduling multiple instants for transmission of the buffered uplink traffic (which requires additional scheduling latency), leading to degraded spectral efficiency. Thus, such 'under-allocation' or 'over-allocation' for a given UE typically results in wasted uplink network resources that could have been allocated or used for uplink traffic from another UE device. Increasing the number of quantization levels (e.g., ranges) may reduce an amount of over-allocated or under-allocated resources but a set of index values that may be needed to represent the larger number of possible ranges may require more bytes to indicate a given index in an uplink BSR indication transmission, which also increases reporting overhead used for the BSR report.

Therefore, dynamic BSR reporting that is adaptive with respect to an amount, or type, or uplink traffic buffer at a UE is desirable for efficient uplink transmissions, especially for capacity-demanding and latency-demanding use cases, where the buffered traffic size dynamically varies in time depending on the traffic flow, and type of associated quality of service (QoS) settings.

As disclosed herein a variable buffer status report configuration, which may comprise a function, or functions, may be transmitted from the RAN to the UE to be used by the UE to calculate a buffer status indication based on a precision value, instead of the UE using a conventional, pre-determined, hard-coded table with defined traffic size ranges associated with certain BSR index values.

Turning now to the figures, FIG. 1 illustrates an example of a wireless communication system 100 that supports blind decoding of PDCCH candidates or search spaces in accordance with aspects of the present disclosure. The wireless communication system 100 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 12.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times UEs 115 may be devices in different forms or having different capabilities. Some example UEs 115 are illustrated in FIG. 1. UEs 115 described herein may be able to communicate with Various types of devices, such as other UEs 115, base stations 105, or network equipment (e.g., core network nodes, relay devices, integrated access and backhaul (JAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2, Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equip-ment including macro eNBs or gNBs, small cell eNBs or gNBs, or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone (node where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carder modulation (MCM) techniques such as orthogonal frequency division multiplexing (OFDM) or discrete Fourier transform spread OFDM (DFT-S-OFDM)), In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more MVPs having the same or different numerologies. In some examples, a UE 115 may be configured with multiple BWPs. In some examples, a single IMP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s-1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)) Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally, or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate, Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. LTEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData), Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles UEs 115). In some examples, vehicles may communicate using vehicle-to-everything (V2X) communications, vehicle-to-vehicle (V2V) communications or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) 5G core (5GC), which may include at east one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-thigh frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHE or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support, beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115, Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115 may be performed using multiple beam directions, and the device may use a combination of digital preceding or radio frequency beamforming to generate; a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a LIE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique Par increasing the likelihood that data is received comedy over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HART) feedback, where the device may provide HARQ feedback in a specific slot for data received in a previous symbol in the slot. In other cases, the device may provide HAW) feedback in a subsequent slot, or according to some other time interval.

Figure 2:
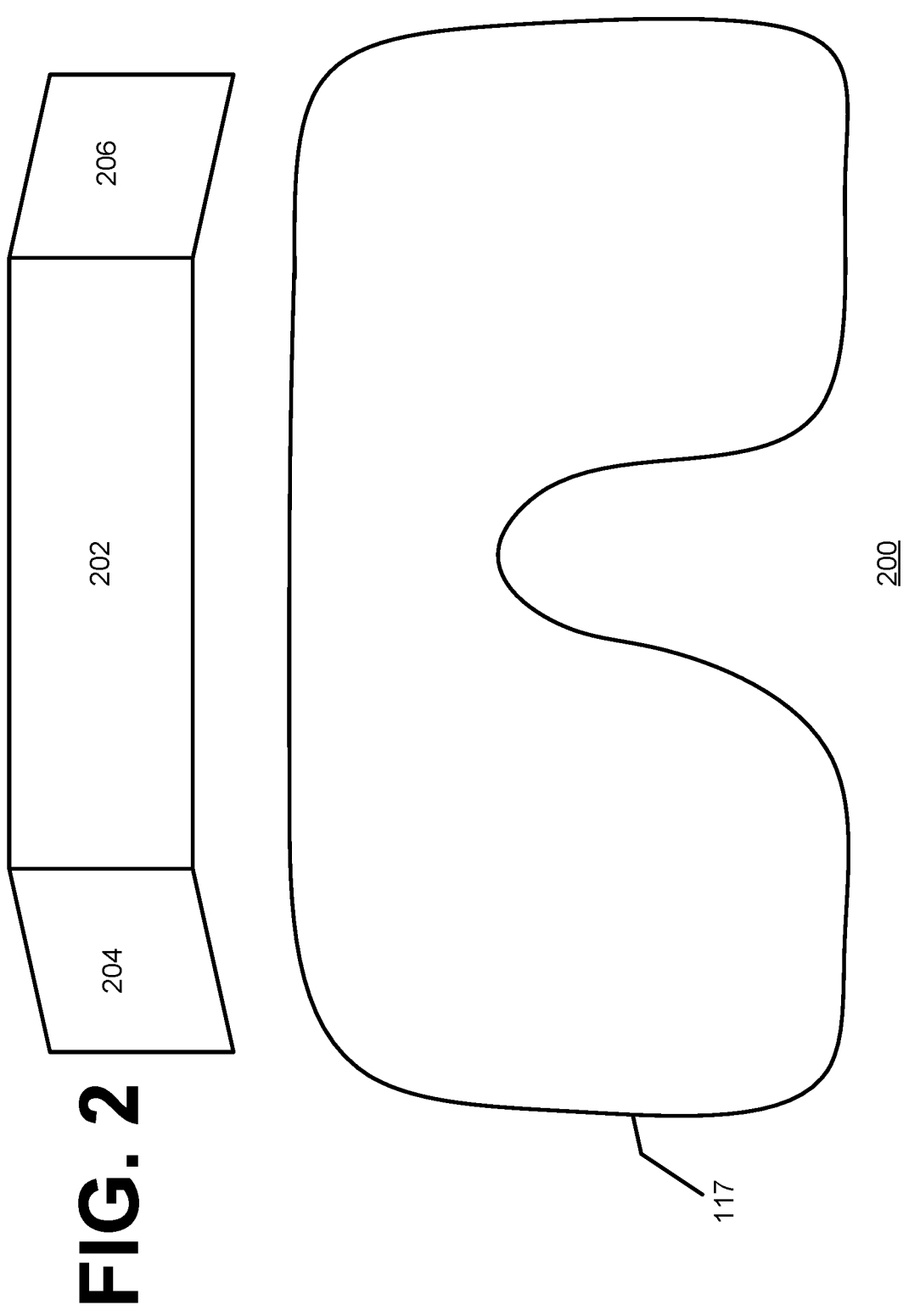
FIG. 2 illustrates an example virtual reality appliance.

Turning now to FIG. 2, the figure illustrates a virtual reality ("VR") application system 200. In system 200, wearable VR appliance 117 is shown from a wearer's, or viewer's, perspective. VR appliance 117 may comprise a center, or pose, visual display portion 202, a left visual display portion 204 and a right visual display portion 206, that may be used to display main visual information, left peripheral visual information, and right peripheral visual information, respectively. As shown in the figure, the portions 202, 204, and 206 are delineated by distinct lines, but it will be appreciated that hardware or software may facilitate gradual transition from main and peripheral information display.

As discussed above, different XR use cases may require different corresponding radio performance. Typically, for XR use cases but unlike for URLLC or eMBB use cases, high-capacity radio links that carry XR data traffic (e.g., data flows that comprise visual information) with stringent radio levels (e.g., latency) and reliability levels are required for a reasonable end user experience. For example, compared to 5 Mbps URLLC link with a 1 ms radio latency budget, some XR applications require 100 Mbps links with about 2 mS allowed radio latency.

From research, several characteristics have been determined that for XR data traffic: (1) XR traffic characteristics are typically periodic with time-varying packet size and packet arrival rate; (2) XR capable devices may be more power-limited than conventional mobile handsets, (e.g., smart glasses, projection wearables, etc.) due to the limited form factor of the devices; (3) multiple data packet flows corresponding to different visual information of a given XR session are not perceived by a user as having the same impact on the end user experience.

Thus, in addition to needing XR-specific power use efficiency, smart glasses, such as wearable appliance 117, streaming 180-degree high-resolution frames requires broadband capacity for providing an optimum user experience. However, it has been determined that data corresponding to the frames that carry main, or center visual information (i.e., the pose or front direction) are the most vital for end user satisfaction, while the frames corresponding to peripheral visual information have a lesser impact on a user's experience. Therefore, accepting higher latency for less important traffic flows so that resources that would otherwise be allocated to the less important traffic flows can be used for traffic flows corresponding to more important traffic, or to devices that carry the more important traffic, may be used to optimize overall capacity and performance of a wireless communication system, such as a 5-G communication system using NR techniques, method, systems, or devices. For example, a wireless data traffic flow carrying visual information for display on center, or pose, visual display portion 202 may be prioritized higher than a wireless data traffic flow carrying visual information for left visual display portion 204 or for right visual display portion 206.

The performance of a communication network in providing XR services may be at least partially determined according to satisfaction of users of the XR services. Each XR-service-using user may be associated with certain QoS metrics to satisfy the performance targets of the user's service, in terms of perceived data rate, end-to-end latency, and reliability.

A 5G NR radio system typically comprises a physical downlink control channel ("PDCCH"), which may be used to deliver downlink and uplink control information to cellular devices. The 5G control channel may facilitate operation according to requirements of URLLC and eMBB use cases and may facilitate an efficient coexistence between such different QoS classes.

Dynamic Device-Specific Buffer Status Reporting with Buffer-Range-Specific Step Size.

Precision of the BSR quantization significantly impacts the scheduling latency, both device and network achievable capacity. Enhancing the quantization precision, (e.g., smaller step size for determining index values that indicate to a RAN traffic to be transmitted by the user equipment), across all buffer size ranges and with a fixed pattern is inefficient due to the time-varying characteristics of the uplink traffic of each device class in 5G systems. For example, some user equipment devices may typically transmit a moderate amount of traffic packets while other user equipment devices may typically transmit a larger amount of traffic packets, (e.g., virtual reality traffic). Thus, a fixed step size for all devices, even if more precise/small than a step size corresponding to a less efficient BSR quantization, may not be optimal.

To improve uplink resource usage efficiency, as disclosed herein a gNB, or RAN, may dynamically configure each of multiple user equipment devices with device-specific BSR precision and corresponding step sizes that are appropriate for the device's type of traffic or device class. Configured BSR step sizes are associated with each range of the buffer size, e.g., a certain step size for a certain buffered traffic size in the uplink buffer of the device. Accordingly, in an embodiment, a user equipment may generate, compile and build, or otherwise determine, a determined BSR table, or a determined BSR configuration, that may vary, or change, according to changing conditions, such as traffic amount and type, based on configured device-specific and buffer-size-specific BSR step sizes that are received in a variable buffer status report configuration from the RAN. (It will be appreciated that that the term 'table' is used for purposes of illustration in the figures and that other forms of storing a configuration and using functions of the configuration may be used instead of a table.) A user equipment may generate, calculate, or otherwise determine an index value from a row of the determined BSR table, which row may correspond to a range of bytes of buffered traffic. The user equipment may transmit to a RAN serving the user equipment the determined index value as a buffer status report indication.

Different user equipment devices, of different device classes or that have different types of traffic buffered, may adapt, or determine to use, different BSR reporting accuracy/precision values to use in one or more functions of the variable buffer status report configuration based on ranges of amounts of the buffered traffic, which ranges may correspond to uplink traffic that may likely be available at, or buffered by, the devices, to be transmitted, to result in a reduction of scheduling latency and to enhance overall network capacity and efficiency while minimizing the BSR reporting overhead (since overhead will be adapted across different devices depending on priority or criticality of uplink traffic buffered for transmission by the devices).

Figure 3A:
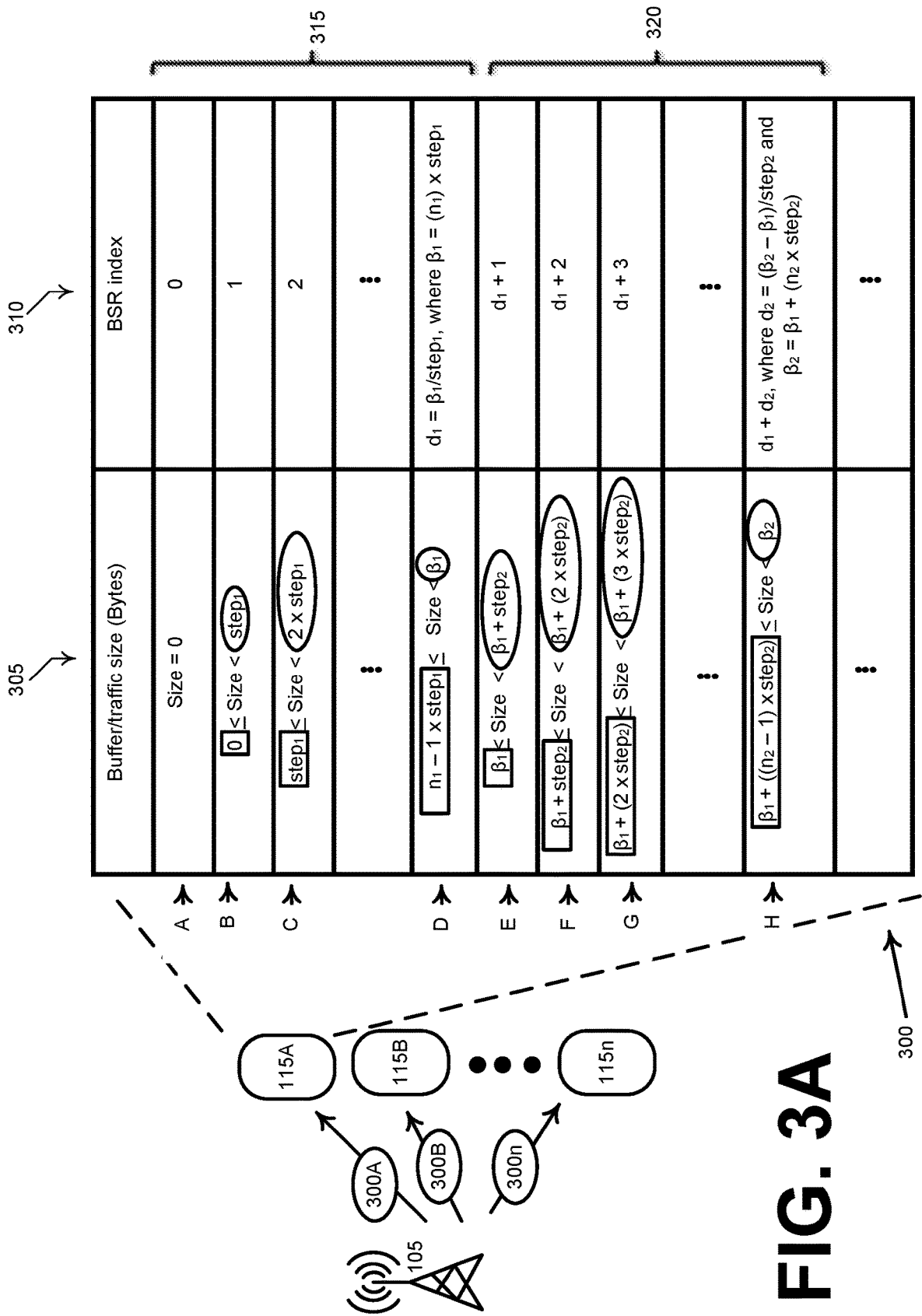
FIG. 3A illustrates an example variable buffer status report configuration.

Turning now to FIG. 3A, the figure illustrates an example variable buffer status report configuration 300. Dynamic BSR configuration table 300 and reporting procedures that use indications determined based on the variable BSR configuration table may facilitate determining buffer status indications that correspond to uplink traffic buffered in a given user equipment device. A RAN 106 may transmit a variable buffer status reporting configuration 300a-300n to one or more user equipment devices 115A-115n Variable buffer status report configurations 300 transmitted from RAN 105 to a UE 115 may be different and device-specific, or the same variable buffer status report configuration may be transmitted from RAN 105 to devices 115A-115n. Different variable buffer status report configurations 300 may comprise different functions from one device to the next. The functions in different rows A-H for criterion field 305 and for buffer status indication field 310 for one UE may be different from configurations 300 transmitted to UE devices or the functions may be the same for the UE devices but different variables may be used by different devices depending on parameters, such as, for example, a buffer size of a UE 115, an amount of traffic buffered in a UE, a type of traffic buffered in a UE, or a device type of a UE. Functions in field 310 may be referred to as index functions of a first precision variable and functions of field 305 may be referred to as buffer status criterion functions and may correspond to index functions on the same rows A-H as shown in configuration 300 of FIG. 3. A precision variable may be referred to as a step size, or a step variable, and configuration 300 may comprise different precision variables for different traffic size ranges 315 or 320. Traffic size ranges may be defined by configuration 300.

First size range 315 may correspond to a first range threshold $\beta_1$ and a first step size/first precision variable steps and a first number of steps $n_1$, and second size range 320 may correspond to a second range threshold $\beta_2$ and a second step size/second precision variable $step_2$ and a first number of steps $n_2$. A UE 115 may determine which range of configuration 300 to use in determining a buffer status report indication that indicates uplink traffic that resides in the UE's buffer based on uplink traffic that is buffered in the UE's buffer.

Thus, RAN node 105 may configure each UE 115 with new information elements, including: device-specific BSR step size groupings, where a group may comprise multiple step sizes, each step size being associated with a certain buffered traffic size range, or an index of a pre-defined BSR table, from a list of BSR tables, corresponding to several available BSR step size groups. A RAN may transmit multiple different variable buffer status report configurations 300 to a UE 115 and later transmit an indication of which of the configured variable buffer status report configurations to use instead of transmitting an entire configuration to be used by the UE every time a change in buffer status report configurations should be made by the UE. A UE 115 may determine which of multiple variable buffer status report configurations to use. Storing multiple variable buffer status report configurations by a UE 115 may consume more memory space of the UE but may also reduce downlink traffic resource usage in indicating by RAN 105 to the UE which of several buffer status report configurations to use.

Different UE devices 115A-115n may transmit different sized buffer status reports, or different size buffer status report indications, due to indices calculated from a function in field 310 varying in size based on a per-device adopted BSR step size group, for example a step size group of entries in configuration 300 corresponding to range 315, being different than another step size group, for example a group corresponding to range 320. After receiving a buffer status report indication calculated by a UE 115 according to variable buffer status report configuration 300 based on an amount of traffic stored in a buffer of the UE, RAN 115 may assign sufficient uplink resources to carry the uplink traffic from the UE to the RAN. In a scenario where a UE 115 has different types of traffic buffered to be transmitted, the UE may use, in an embodiment, the same variable buffer status report configurations 300 for indicating an amount of aggregate buffered traffic, and accordingly, transmit a single buffer status report indication. In another embodiment described in more detail below in reference to a UE determining multiple buffer status report indications corresponding to different traffic types, a UE 115 having different types of traffic to transmit may use different buffer status report configurations for determining different respective buffer status report indications to transmit to RAN 105. RAN 105 may allocate different uplink resources to the given UE for different uplink traffic types based on the different buffer status report indications received from the UE.

Figure 17A:
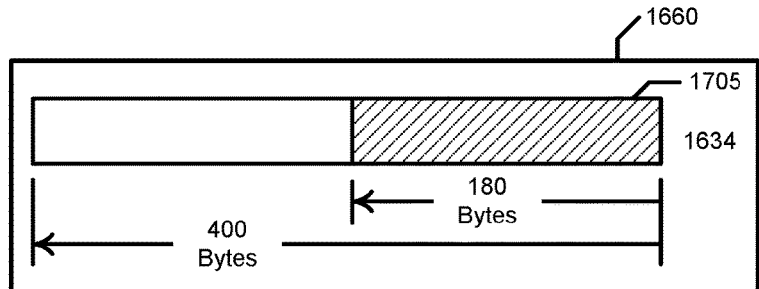
FIG. 17A illustrates a user equipment having a memory with a first type of uplink traffic buffered.
Figure 17B:
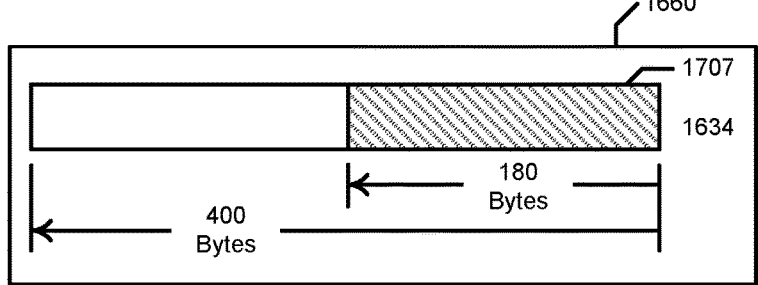
FIG. 17B illustrates a user equipment having a memory with a second type of uplink traffic buffered.
Figure 17C:
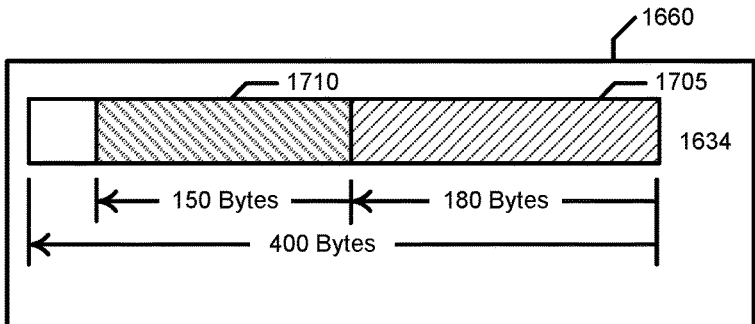
FIG. 17C illustrates a user equipment having a memory with a first type of uplink traffic buffered and a second type of uplink traffic buffered.

FIGS. 17A-17C show different examples of traffic buffered in a buffer/memory 1634 of UE 1660. In FIG. 17A, buffer 1634 is shown with a capacity of 400 Bytes. A first type of traffic 1705 is buffered in buffer 1634. Using variable buffer status report configuration 300 shown in FIG. 3A, UE 115 (which may comprise memory 1634 shown in FIG. 17A) may calculate a buffer status report indication based on the capacity size 400 Bytes of the buffer, or a buffer status report indication may be calculated based on the 180 Bytes of the first type of traffic 1705 buffered in the buffer. If variable buffer status report configuration comprises a configuration of first group 315 of entries A-D of table 300 having a first precision variable, or step size variable, $step_1$ of 25 Bytes, a first number of steps $n_1$ being 10, a first threshold $\beta_1$ of 250 Bytes, and an index function defined for first range entries 315 of ((previous index value−1)×$step_1$) ≤size of buffered traffic<((current index value)×$step_1$), UE 115 may determine a buffer status report index of 8, which would correspond to a criterion range from criterion functions shown in field 305 of table 300 of 175 KB<buffered traffic size<200 KB. (It will be appreciated that in the example the precision variable $step_1$, the number of steps $n_1$, and the threshold $\beta_1$ for defining the extent of first range 315 are interrelated insofar as $\beta_1/n_1=step_1$, thus the term precision variable could refer to one of $step_1$, $\beta_1$, or $n_1$ if the other terms are known, defined, or configured). Functions for lower bounds of criterion functions 305 are surrounded by rectangles and functions for upper bounds for the criterion functions are shown surrounded by ovals in FIG. 3A.

FIG. 17B shows a second type of traffic, traffic 1707, that is different from first traffic type 1705, as indicated by different directions of shading lines in FIG. 17A and FIG. 17B, respectively. A user equipment may use a different variable buffer status configuration, or a different precision variable to determine a buffer status indication to transmit to a RAN to indicate traffic 1707 than the same user equipment may use to generate a buffer status report to indicate traffic 1705 shown in FIG. 17A, even though traffic 1707 and traffic 1705 both comprise 180 Bytes. (It will be appreciated that traffic described in reference to FIGS. 3A, 17A, and 17B is described in terms of Bytes (B), but could also be described in terms of KiloBytes (KB), or other units.)

FIG. 17C shows first buffered uplink traffic 1705 of a first type comprising 180 Bytes of data and second buffered uplink traffic 1710 of a second type comprising 150 Bytes of data. Together, first traffic 1705 and second traffic 1710 comprise 330 bytes. Thus, a UE may generate a buffer status report indication based on a buffered amount of data comprising 330 Bytes. As described below in more detail in reference to Traffic-aware buffer status reporting, a UE may generate and transmit two different buffer status report indications for uplink traffic buffered in buffer 1634 shown in FIG. 17C.

FIG. 3B illustrates an example table 350 that may be determined, or 'filled in' by inputting into the functions shown in FIG. 3A precision variables, or step sizes, $step_1$ and $step_2$, bound variables, or bound functions, $\beta_1$ and $\beta_2$, and numbers of steps $n_1$ and $n_2$ per ranges 315 and 320, respectively, as described in reference to FIG. 3A. In the example shown in FIG. 3B, $step_1=2$ Bytes, $\beta_1=10$ Bytes, and $n_1=5$ steps for a first range 315 and $step_2=5$ Bytes, $\beta_2=20$ Bytes, and $n_2=2$ steps for a first range 320. Thus, a UE that receives variable buffer status reporting configuration 300 described in reference to FIG. 3A may calculate buffer status report indexes/indications 310 by applying a determined amount of buffered traffic to a function, or functions, 305, or a UE may calculate and store the variable buffer status report configuration as table 350 shown in FIG. 3B and lookup in the table a buffer status report indication in column 360 (values of which may correspond to, or may be derived from, functions 310 in configuration 300 shown in FIG. 3A) that is associated with an expression 355 (which may correspond to respective function 305 in configuration 300 shown in FIG. 3A), wherein the buffer status report indication in column 360 corresponds to an amount of uplink traffic buffered in the UE for transmission. (It will be appreciated that the rows of table 350 may not correspond exactly with the rows of configuration 300 shown in FIG. 3A due to the numbers used in the example shown in FIG. 3B resulting in a different number of rows for first range 315 and second range 320 in table 350 as compared to the number of rows in configuration 300, thus FIG. 3B does not show letters to identify rows of table 350 to avoid confusion.)

Turning now to FIG. 4, the figure illustrates a timing diagram 400 showing acts to configure a UE 115 to use a variable buffer status report configuration to provide a buffer status report indication that is based on criterion that varies according to a buffer of UE 115. The criterion may be based on a buffer size of UE 115 device, an amount, or size, of traffic buffered in a buffer, or memory, of the UE, a device type of the UE, or a traffic type of the traffic buffered in the UE. UE 115 may be referred to as a wireless transmit receive unit ("WTRU").

At act 405, RAN 105 may transmit a dynamic/variable buffer status report ("BSR") step configurations to WTRU 115, which receives at act 410 the configuration transmitted at act 405. A variable BSR configuration transmitted at act 405 may comprise a device-specific BSR step group index. A device-specific strep group index may correspond to a step size of a configured list of BSR step groups, where a step group corresponds to one or more BSR step sizes associated one or more respective traffic size ranges that may be applied to uplink traffic buffered in a buffer of UE 115. On condition that UE 115 determines that it is buffering uplink traffic, the UE may generate at act 415 a BSR table, based on the configured BSR step size group that corresponds to an amount of buffered uplink traffic, or based on another metric, such as a buffer size of the UE, or based on a type of uplink traffic buffered by the UE. At act 420, UE 115 determines a BSR index, or a BSR indication, that corresponds to the actual size of buffered traffic, thus the determined BSR indication indicates an amount of traffic, a traffic type, or a buffer size of the UE. UE 115 may determine the BSR report indication based on a function, or by comparing, for example, an amount of uplink traffic it has in a buffer that is ready to be transmitted to a table that it may have already determined based on a criterion function in the variable buffer status report configuration received at act 410. The table, or determination of the buffer status report indication may also be massed on an index function that corresponds to a respective criterion function that corresponds to the uplink traffic, uplink traffic type, or uplink buffer size of the UE. At act 425 UE 115 transmits the determined BSR index/indication with an uplink scheduling during a configured uplink control channel opportunity. At act 430, after receiving a buffer status report indication transmitted at act 425, RAN 105 may allocate network uplink resources, such as timing and/or frequency resources (e.g., one or more uplink transmission occasions and one or more corresponding frequencies or frequency ranges), to be used by UE 115 to transmit the traffic that is buffered by the UE. At act 435, RAN 105 transmits an indication of the allocated uplink resources to UE 115. After receiving an allocated resources indication, at act 440 UE 115 transmits uplink traffic that is buffered in a buffer or memory of the UE.

Traffic-Aware Buffer Status Reporting.

Figure 5:
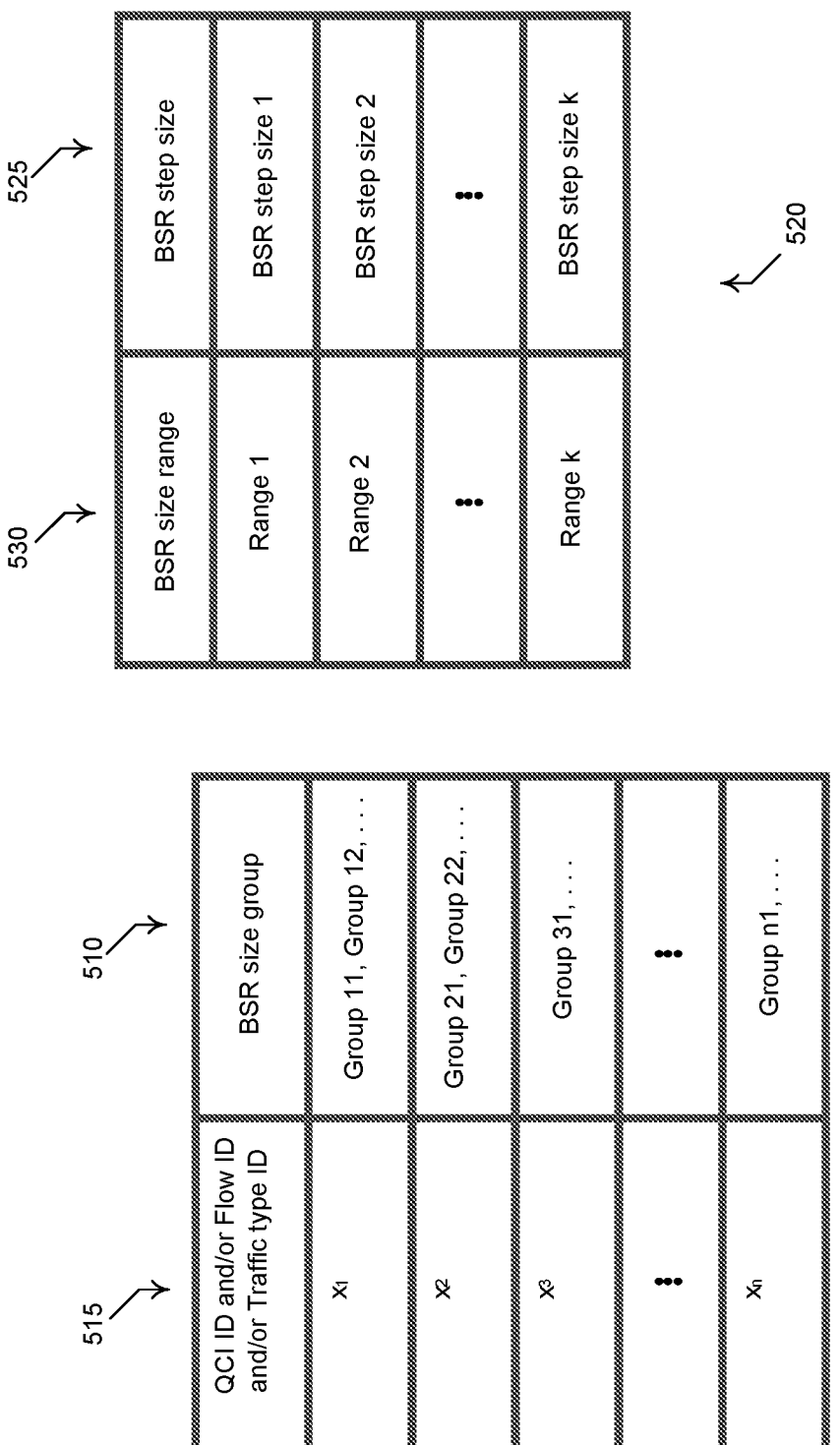
FIG. 5 illustrates an example embodiment traffic-specific variable buffer status report configuration.

Turning now to FIG. 5, the figure illustrates a diagram of an example variable buffer status configuration 500 that may be used by a UE to indicate to a serving RAN one or more traffic sizes, or traffic types, using traffic range groupings, or identifiers, 510 that may indicate different categories of buffered traffic corresponding to different traffic flow identifiers 515, or the identifiers may correspond to different traffic types, for example flows for different purposes or having different Quality of Service levels or requirements. Different first uplink traffic 1705 of a first type and a first size and second uplink traffic 1710 of a second type and a second size being buffered in the same UE 1660 are shown in FIG. 17C. Continuing with description of FIG. 5, different traffic-specific group size identifiers 510 of variable buffer status configuration 500 may correspond to different respective BSR report tables, or functions, 520, which may be used to determine a buffer status step size 525 and corresponding range values 530. One or more step sizes 525 and range values 530 may be used with a variable buffer status report configurations, such as configuration 300 described above in reference to FIG. 3, to determine multiple buffer status report indexes, or indications, corresponding to uplink traffic of multiple traffic flows buffered in a UE. Thus, a UE may simultaneously, or substantially simultaneously, transmit different, buffer status report indications, with each being associated with a certain type of uplink traffic or a certain uplink traffic flow that is buffered in one or more uplink buffers of the UE. Such different buffer status report indications may indicate to a serving RAN network a more refined, or comprehensive, report of uplink traffic buffered traffic by the UE for uplink transmission, which may facilitate the serving/receiving RAN in improving efficiency in allocating uplink resources for the types of traffic indicated by the different, buffer status report indications, such that, for example, a first uplink resource allocation can be effectively tuned towards fulfilling a first QoS target/requirement of a first buffered uplink traffic flow and a second uplink resource allocation can be effectively tuned towards fulfilling a first QoS target/requirement of a second buffered uplink traffic flow.

Thus, as depicted in FIG. 5, the RAN may configure UE devices with traffic-specific BSR step size groups, where different BSR group identifiers may result in different BSR quantization precision being associated with different respective traffic type identifiers, flow identifiers, or Quality of Service Class Identifiers ("QCI"). Thus, for critical traffic flows, highly refined BSR functions, or a table, or tables, calculated or determined therefrom, corresponding to multiple and different traffic flows buffered by a UE may be established, while more relaxed BSR may be adopted, using precision variables, or values to be substituted therefor in a function, that result in lower accuracy for less critical (e.g., best effort) buffered traffic types. It will be appreciated that multiple buffer status report identifiers may facilitate enhanced resource allocation for different traffic flows at the expense of increased buffer traffic reporting indication overhead.

Figure 6:
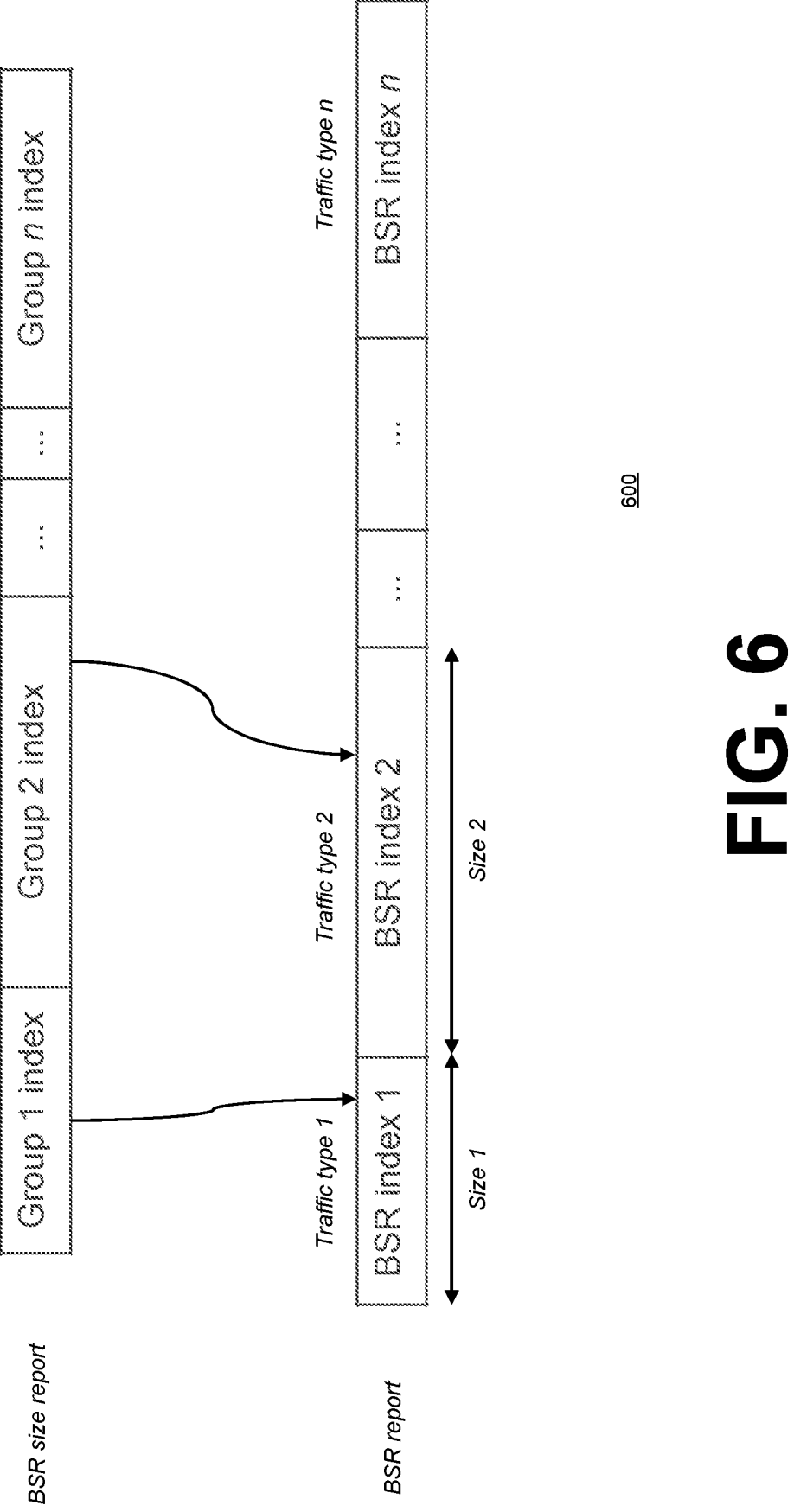
FIG. 6 illustrates an example embodiment aggregated buffer status report format indication that indicates one or more buffer status report indication sizes of respective one or more buffer status report indications determined by a user equipment based on buffered traffic and a variable buffer status report configuration.

Accordingly, in an embodiment, UE devices, upon receiving traffic-specific BSR configurations 500, may dynamically construct corresponding BSR tables, and therefore, select a BSR index from each BSR table that best matches the size of each actual buffered traffic type. In FIG. 6, variable buffer status report configuration 600 illustrates an embodiment that a UE may use to indicate to a RAN a format or a size of one or more buffer status report indications that may be transmitted, or that have been transmitted, by the UE.

Accordingly, a UE device may compile an aggregated BSR report that may include multiple, different BSR indices determined from constructed BSR tables to reflect how much buffered traffic is available and corresponding respective traffic types, as shown by FIG. 6. This may result in sizes of different aggregate BSR reports being different and time varying if generated by the same device but at different times. This phenomenon may be attributed to varying BSR indices due to varying availability of different buffered traffic types at different times.

In an embodiment, a RAN/gNB may blindly decode a received aggregate BSR report, and may attempt possible size cases until the RAN/gNB is able to extract the actual transmitted BSR indices inside the aggregate BSR report. This typically does not add additional BSR reporting overhead but may come at the expense of higher RAN/gNB processing complexity.

In another embodiment, a BSR transmitting devices (e.g., user equipment device) may transmit additional indications, within a scheduling request transmission, which indicates to the receiving RAN/gNB a real-time selected BSR step size groups for BSR indices of an aggregate BSR report. Accordingly, the RAN/gNB may be able to determine a format and size of buffer status report indications of an aggregate BSR report and thus, perform a regular and less complex decoding of the received BSR reports. However, this may increase BSR reporting overhead, due to the additionally transmitted BSR format indications, but may result in a benefit of a faster and less complex decoding operation at the RAN node side.

Turning now to FIG. 7, the figure illustrates timing diagram of method 700 to configure a UE 115 with a variable buffer status report configuration to determine buffer status indications to obtain uplink resources to use to transmit uplink traffic buffered in the UE to RAN 105. At act 705 RAN 105 transmits to UE/WTRU 115 receives dynamic, variable buffer status report (BSR) step configurations from serving cell RAN 105 that may include multiple traffic-specific BSR step group indices, based on a defined list of BSR step groups, where each indicates one or more BSR step sizes associated with size ranges of uplink traffic in a buffer of the UE, or may be associated with flow identifiers, traffic type, or quality of service class identifiers (QCI). At act 710 UE 115 receives the variable buffer status report configuration that was transmitted at act 705. At act 715, on condition of uplink traffic being buffered in UE 115, the UE determines a BSR step size group, associated with each buffered traffic type, or, flow ID, or, QCI ID. UE 115 compiles one or more corresponding BSR tables, based on the determined BSR step size groups, and determines one or more BSR indices corresponding to one or more respective buffered traffic types, flow identifiers, or QCIs. In an embodiment, at act 720 UE/WTRU 115 may transmit determined BSR indices, each of a certain determined size, with an uplink scheduling indication during a configured uplink control channel opportunity. In another embodiment, at act 720 UE/WTRU 115 may transmit individual indications of selected BSR step size groups (from the predefined list of BSR step size groups) and the corresponding BSR indices/ reports, associated with the buffered traffic types.

Turning now to FIG. 8, the figure illustrates a flow diagram of a method 800 to configure a UE to use one or more variable buffer status report configurations to indicate, to a RAN serving the UE, uplink traffic buffered in the UE so that the RAN can allocate resources that the UE can use to transmit the buffered uplink traffic to the RAN. Method 800 begins at act 805. At act 810 the RAN transmits a variable buffer status configuration to UE devices. The variable buffer status configurations may be device specific, in other words, one UE may receive a different variable buffer status configuration than another UE. At act 815 UE devices receive variable buffer status configurations that were transmitted at act 810. At act 820, a UE that received a variable buffer status report configuration evaluates uplink traffic that it has buffered for uplink transmission. The evaluation that the UE performs at act 820 may comprise, inter alia, determining a size or amount of traffic buffered in a buffer, a total size of the buffer, a type of traffic that may be buffered at the UE device, a quality of service that may be associated with traffic that is buffered at the UE device, a device type of the UE, or another metric associated with a parameter that relates to uplink traffic buffered by the UE.

At act 825 the UE determines a precision variable value, that may have been received in the variable buffer status configuration, or that may have been otherwise configured or determined, to use based on the evaluation of buffered traffic at act 820. Depending on the amount of traffic that a UE has buffered, the size of a buffer, a type of traffic that UE has buffered or device type of the traffic that the UE has buffered, a different precision variable may be determined. At act 830, based on the precision variable value determined at act 825, the UE determines a buffer status report indication by applying they determined precision variable value to a function of, or table derived from, the variable buffer status configuration that was received at act 815. At act 835 a determination is made whether more indexes may need to be determined—for example if the UE has multiple types of traffic buffered, a different indexes/indices corresponding to the different types of traffic may be determined. If a determination is made at act 835 that another index is to be determined method 800 returns to act 825.

If a determination is made it at act 835 that another buffer status report index is not to be determined, method 800 advances to act 840. At act 840 a determination is made at the UE whether the UE is configured to transmit a buffer status report indication format indication. A buffer status report indication format indication may comprise a size of a buffer status report indication, which size may vary based uplink traffic that is buffered in the UE. A format indication may be transmitted during an uplink control channel configuration to the RAN that transmitted the variable buffer status configuration at 810. The buffer status report indication format indication may contain information that notifies, or makes the RAN aware of, a size of a buffer status report indication that the UAE may soon transmit to the RAN. If a determination is made at act 840 that the UE is configured to, or needs to, transmit a buffer status report indication format indication method 800 advances to act 845. At act 845 the UE transmits a buffer status report indication format indication to the RAN and advances to act 847. The indication transmitted at act 845 may comprise an indication of a size of a soon-to-follow buffer status report indication to be transmitted by the UE that transmits the format indication at act 845. If a determination made at act 840 is that a buffer status report indication format indication does not need to be transmitted, or that the UE is not configured to transmit such an indication, method 800 advances to act 847.

At act 847 the UE transmits a buffer status report indication to the RAN. The buffer status report indication may comprise an index that may have been determined by the UE by determining a precision value, or a step value in terms of a size (e.g., a value in terms of Bytes), and using the determined precision value as a value in place of a precision variable in a function that comprises the precision variable, which precision variable or function may have been part of the variable buffer status report configuration receive at act 815.

At act 850 the RAN receives and decodes the buffer status report indication. The decoding at act 850 may comprise blind decoding or may comprise decoding using a device specific identifier corresponding to the UE that transmitted the buffer status indication at act 847. Decoding at act 850 may be performed according to the buffer status report indication format indication transmitted at act 845. After decoding a buffer status report indication at act 850 the RAN may allocate uplink resources to facilitate uplink transmission from the UE of the uplink traffic buffered in the UE.

At act 860 the RAN transmits an uplink resource allocation indication to the UE. At act 865 the UE receives the resource allocation indication. The resource allocation may comprise, for example, timing occasions to be used to transmit uplink traffic packets, or messages, or the resource allocation indication may indicate uplink frequencies to use to transmit uplink traffic that is buffered at the UE. At act 870 the UE transmits the buffered uplink traffic according to the uplink resources indicated in the resource allocation received at act 865. Method 800 ends at act 875.

Turning now to FIG. 9, the figure illustrates an example embodiment method 900 comprising at block 905: facilitating, by a radio access network node comprising a processor, transmitting, to a first user equipment, a first variable buffer status report configuration; at block 910 facilitating receiving a first buffer status report indication indicating, according to the first variable buffer status report configuration, first uplink traffic data buffered in the first user equipment; at block 915 allocating a first uplink resource, to be used by the first user equipment to transmit the first uplink traffic data, based on the first buffer status report indication; at block 920 facilitating transmitting, to the first user equipment, a first resource indication of the first uplink resource; at block 925 monitoring the first uplink resource for the first uplink traffic data; at block 930 wherein the first variable buffer status report configuration comprises at least a first index function of a first precision variable, wherein the first variable buffer status report configuration comprises a first buffer status criterion function corresponding to the first index function, and wherein the first buffer status criterion function comprises the first precision variable; and at block 935 facilitating, by the radio access network node, transmitting, to a second user equipment, a second variable buffer status report configuration, wherein the second variable buffer status report configuration is different than the first variable buffer status report configuration.

Turning now to FIG. 10, the figure illustrates an example system 1000, comprising at block 1005: a computer executable component of a communication network node comprising a processor, the processor configured to: transmit, to a user equipment, a first variable buffer status index function; at block 1010 receive a first buffer status report indication corresponding to the user equipment and indicating first uplink traffic data buffered at the user equipment; at block 1015 allocate, based on the first buffer status report indication, a first scheduled uplink time resource to be used by the user equipment to transmit the first uplink traffic data; at block 1020 transmit, to the user equipment, a first resource indication of the first scheduled uplink time resource; at block 1025 monitor the first scheduled uplink time resource for the first uplink traffic data transmitted by the user equipment; at block 1030 wherein the first variable buffer status index function comprises at least one of a first precision variable or a first bound variable, wherein the first variable buffer status index function comprises a first buffer status criterion function corresponding to the first index function, wherein the first buffer status criterion function comprises at least one of the first precision variable or the first bound variable, wherein the first precision variable corresponds to a first buffered data amount range, wherein the first variable buffer status index function comprises at least a second precision variable or a second bound variable, wherein the first variable buffer status index function comprises a second buffer status criterion function corresponding to the second index function, wherein the second buffer status criterion function comprises at least one of the second precision variable or the second bound variable, and wherein the second precision variable corresponds to a second buffered data amount range; and at block 1035 wherein the processor is further configured to: allocate a first buffer status report indication resource size, to be used by the user equipment to transmit the first buffer status report indication, wherein the first buffer status report indication resource size is based on the first precision variable, or allocate a second size buffer status report indication resource size, to be used by the user equipment to transmit the first buffer status report indication, wherein the second size buffer status report indication resource size is based on the second precision variable.

Turning now to FIG. 11, the figure illustrates a non-transitory machine-readable medium 1100 comprising at block 1105 executable instructions that, when executed by a processor of a node of a communication network, facilitate performance of operations, comprising: transmitting, to a first user equipment, a first variable buffer status report configuration; at block 1110 transmitting, to a first user equipment, a first variable buffer status report configuration; a block 1115 receiving a first buffer status report indication from the first user equipment and indicating, according to the first variable buffer status report configuration, first uplink traffic data buffered in the first user equipment; at block 1120 allocating a first uplink time resource and a first uplink frequency resource, to be used by the first user equipment to transmit the first uplink traffic data, based on the first buffer status report indication; at block 1125 transmitting, to the first user equipment, a first resource indication of the first uplink time resource and the first uplink frequency resource; at block 1130 monitoring the first uplink time resource and the first uplink frequency resource for the first uplink traffic data transmitted by the first user equipment; at block 1135 transmitting, to the first user equipment, a second variable buffer status report configuration; at block 1140 receiving a second buffer status report indication corresponding to the first user equipment and indicating, according to the second variable buffer status report configuration, second uplink traffic data buffered in the first user equipment; at block 1145 allocating a second uplink time resource and a second uplink frequency resource, to be used by the first user equipment to transmit the second uplink traffic data, based on the second buffer status report indication; at block 1150 transmitting, to the first user equipment, a second resource indication of the second uplink time resource and the second uplink frequency resource; and at block 1155 monitoring the second uplink time resource and the second uplink frequency resource for the second uplink traffic data from the first user equipment.

Turning now to FIG. 12, the figure illustrates an example embodiment method 1200 comprising at block 1205 facilitating, by a user equipment comprising a processor, receiving, from a radio access network node, a first variable buffer status report configuration function; at block 1210 generating, by the user equipment, a first buffer status report indication, corresponding to a first uplink traffic portion buffered in a first memory portion of the user equipment, according to the first variable buffer status report configuration function; at block 1215 facilitating, by the user equipment, transmitting the first buffer status report indication to the radio access network node; at block 1220 facilitating, by the user equipment, receiving, from the radio access network node, a first resource indication of a first uplink resource allocated by the radio access network node based on the first buffer status report indication; at block 1225 facilitating, by the user equipment, transmitting, to the radio access network node using the first uplink resource, the first uplink traffic portion; at block 1230 wherein the first variable buffer status report configuration function comprises one or more index functions of a first precision variable, and wherein the first variable buffer status report configuration function comprises one or more buffer status criterion functions corresponding to the one or more index functions, wherein at least one of the one or more buffer status criterion functions comprises the first precision variable, the method further comprising: analyzing, by the user equipment, the first uplink traffic portion with respect to the one or more buffer status criterion functions to result in an analyzed first uplink traffic portion value; at block 1235 determining, by the user equipment, a determined index function of the one or more index functions based on the analyzed first uplink traffic portion value; at block 1240 determining, by the user equipment, a first index value corresponding to the first uplink traffic portion based on the determined index function; and at block 1245 wherein the first buffer status report indication comprises a first index value.

Turning now to FIG. 13, the figure illustrates an example user equipment 1300 comprising at block 1305 a processor configured to: receive, from a radio access network node, a first variable buffer status report configuration; at block 1310 generate a first buffer status report indication, corresponding to a first uplink traffic portion buffered in a first memory portion of the user equipment, according to the first variable buffer status report configuration; at block 1315 transmit the first buffer status report indication to the radio access network node; at block 1320 receive, from the radio access network node, a first resource indication of a first uplink resource allocated by the radio access network node based on the first buffer status report indication; at block 1325 transmit, to the radio access network node using the first uplink resource, the first uplink traffic portion; at block 1330 wherein the first variable buffer status report configuration comprises one or more indexes that comprise one or more corresponding index functions of at least one of a first precision variable or a first bound variable, wherein the first variable buffer status report configuration comprises one or more buffer status criterion functions corresponding to the one or more index functions, wherein at least one of the buffer status criterion functions comprises at least one of the first precision variable or the first bound variable, and wherein the processor is further configured to: analyze the first uplink traffic portion with respect to the one or more buffer status criterion functions to result in an analyzed first uplink traffic portion value; at block 1335 determine a determined index function of the one or more index functions based on the analyzed first uplink traffic portion value; at block 1340 determine a first index value corresponding to the first uplink traffic portion based on the determined index function; and at block 1345 wherein the first buffer status report indication comprises the first index value, and wherein the first precision variable comprises a data amount.

Turning now to FIG. 14, the figure illustrates a non-transitory machine-readable medium 1400 comprising executable instructions that, when executed by a processor of a user equipment, facilitate performance of operations, at block 1405 comprising: receiving, from a radio access network node, a variable buffer status report configuration comprising a first index function and a second index function, a first buffer status criterion function corresponding to the first index function, and a second buffer status criterion function corresponding to the second index function; at block 1410 generating a first buffer status report indication, corresponding to a first uplink traffic portion buffered in a memory of the user equipment, according to the variable buffer status report configuration; at block 1415 transmitting the first buffer status report indication to the radio access network node; at block 1420 receiving, from the radio access network node, a first resource indication of a first uplink resource allocated by the radio access network node based on the first buffer status report indication; at block 1425 transmitting, to the radio access network node using the first uplink resource, the first uplink traffic portion; at block 1430 wherein the first buffer status criterion function or the first index function comprises at least one of a first precision variable or a first bound variable, and wherein the second buffer status criterion function or the second index function comprises at least one of a second precision variable or a second bound variable; at block 1435 wherein the first buffer status report indication is generated according to the first index function based on the first uplink traffic portion having a traffic portion size that corresponds to the first precision variable; at block 1440 generating a second buffer status report indication, corresponding to a second uplink traffic portion buffered in the memory of the user equipment, according to the variable buffer status report configuration; at block 1445 transmitting the second buffer status report indication to the radio access network node; at block 1450 receiving, from the radio access network node, a second resource indication of a second uplink resource allocated by the radio access network node based on the second buffer status report indication; and at block 1455 transmitting, to the radio access network node using the second uplink resource, the second uplink traffic portion.

Figure 15:
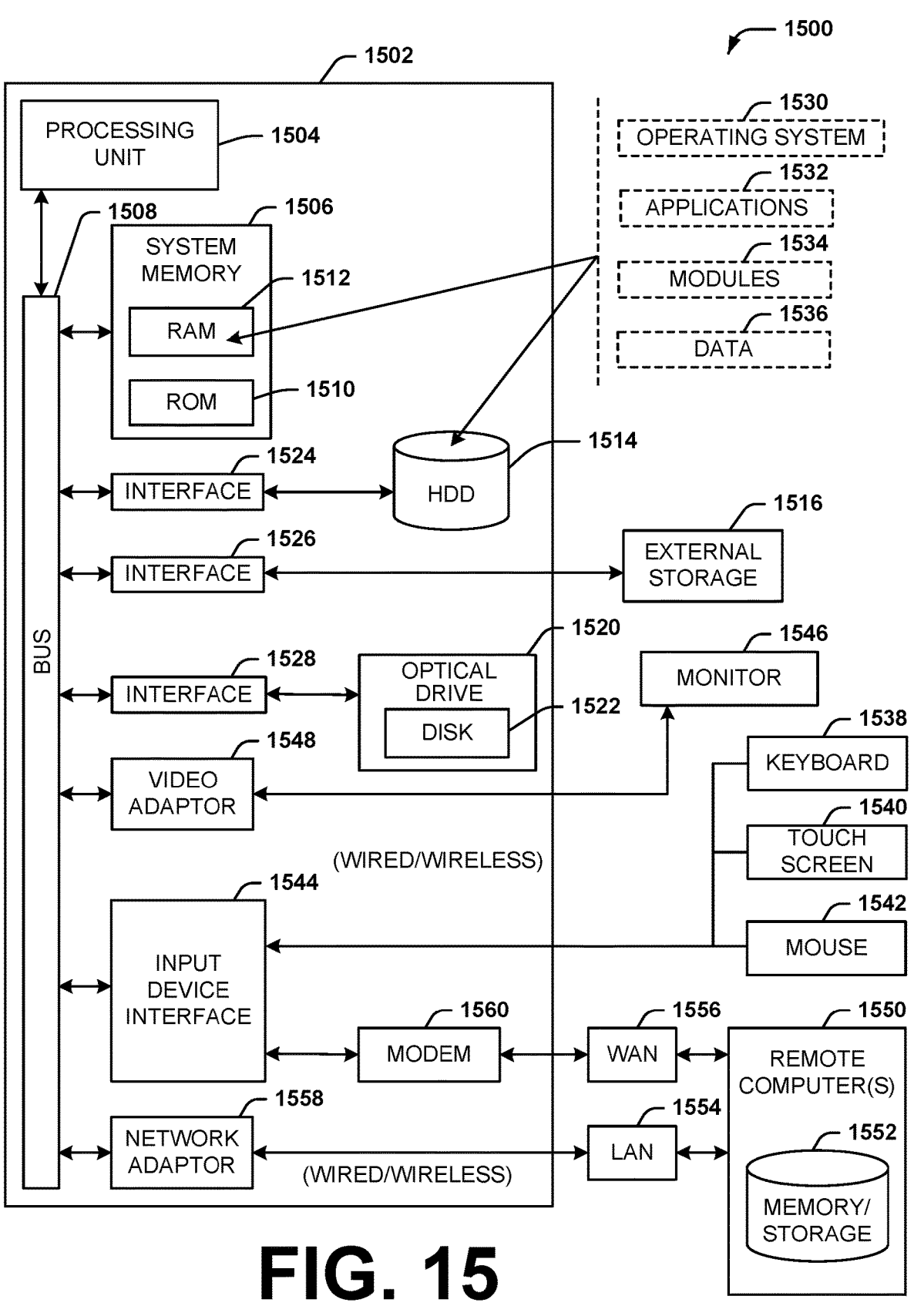
FIG. 15 illustrates an example computer environment.

In order to provide additional context for various embodiments described herein, FIG. 15 and the following discussion are intended to provide a brief, general description of a suitable computing environment 1500 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors and may include a cache memory. Dual micro-processors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

Computer 1502 further includes an internal hard disk drive (HDD) 1514 (e.g., EIDE, SATA), one or more external storage devices 1516 (e.g., a magnetic floppy disk drive (FDD) 1516, a memory stick or flash drive reader, a memory card reader, etc.) and an optical disk drive 1520 (e.g., which can read or write from a CD-ROM disc, a DVD, a BD, etc.). While the internal HDD 1514 is illustrated as located within the computer 1502, the internal HDD 1514 can also be configured for external use in a suitable chassis (not shown). Additionally, while not shown in environment 1500, a solid-state drive (SSD) could be used in addition to, or in place of, an HDD 1514. The HDD 1514, external storage device(s) 1516 and optical disk drive 1520 can be connected to the system bus 1508 by an HDD interface 1524, an external storage interface 1526 and an optical drive interface 1528, respectively. The interface 1524 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

Computer 1502 can optionally comprise emulation technologies. For example, a hypervisor (not shown) or other intermediary can emulate a hardware environment for operating system 1530, and the emulated hardware can optionally be different from the hardware illustrated in FIG. 15. In such an embodiment, operating system 1530 can comprise one virtual machine (VM) of multiple VMs hosted at computer 1502. Furthermore, operating system 1530 can provide runtime environments, such as the Java runtime environment or the .NET framework, for applications 1532. Runtime environments are consistent execution environments that allow applications 1532 to run on any operating system that includes the runtime environment. Similarly, operating system 1530 can support containers, and applications 1532 can be in the form of containers, which are lightweight, standalone, executable packages of software that include, e.g., code, runtime, system tools, system libraries and settings for an application.

Further, computer 1502 can comprise a security module, such as a trusted processing module (TPM). For instance, with a TPM, boot components hash next in time boot components, and wait for a match of results to secured values, before loading a next boot component. This process can take place at any layer in the code execution stack of computer 1502, e.g., applied at the application execution level or at the operating system (OS) kernel level, thereby enabling security at any level of code execution.

A user can enter commands and information into the computer 1502 through one or more wired/wireless input devices, e.g., a keyboard 1538, a touch screen 1540, and a pointing device, such as a mouse 1542. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1504 through an input device interface 1544 that can be coupled to the system bus 1508, but can be connected by other interfaces, such as a parallel port, an IEEE 1394 serial port, a game port, a USB port, an IR interface, a BLUETOOTH® interface, etc.

A monitor 1546 or other type of display device can be also connected to the system bus 1508 via an interface, such as a video adapter 1548. In addition to the monitor 1546, a computer typically includes other peripheral output devices (not shown), such as speakers, printers, etc.

The computer 1502 can operate in a networked environment using logical connections via wired and/or wireless communications to one or more remote computers, such as a remote computer(s) 1550. The remote computer(s) 1550 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1552 is illustrated. The logical connections depicted include wired/wireless connectivity to a local area network (LAN) 1554 and/or larger networks, e.g., a wide area network (WAN) 1556. Such LAN and WAN networking environments are commonplace in offices and companies, and facilitate enterprise-wide computer networks, such as intranets, all of which can connect to a global communications network, e.g., the internet.

When used in a LAN networking environment, the computer 1502 can be connected to the local network 1554 through a wired and/or wireless communication network interface or adapter 1558. The adapter 1558 can facilitate wired or wireless communication to the LAN 1554, which can also include a wireless access point (AP) disposed thereon for communicating with the adapter 1558 in a wireless mode.

When used in a WAN networking environment, the computer 1502 can include a modem 1560 or can be connected to a communications server on the WAN 1556 via other means for establishing communications over the WAN 1556, such as by way of the internet. The modem 1560, which can be internal or external and a wired or wireless device, can be connected to the system bus 1508 via the input device interface 1544. In a networked environment, program modules depicted relative to the computer 1502 or portions thereof, can be stored in the remote memory/storage device 1552. It will be appreciated that the network connections shown are example and other means of establishing a communications link between the computers can be used.

When used in either a LAN or WAN networking environment, the computer 1502 can access cloud storage systems or other network-based storage systems in addition to, or in place of, external storage devices 1516 as described above. Generally, a connection between the computer 1502 and a cloud storage system can be established over a LAN 1554 or WAN 1556 e.g., by the adapter 1558 or modem 1560, respectively. Upon connecting the computer 1502 to an associated cloud storage system, the external storage interface 1526 can, with the aid of the adapter 1558 and/or modem 1560, manage storage provided by the cloud storage system as it would other types of external storage. For instance, the external storage interface 1526 can be configured to provide access to cloud storage sources as if those sources were physically connected to the computer 1502.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 16:
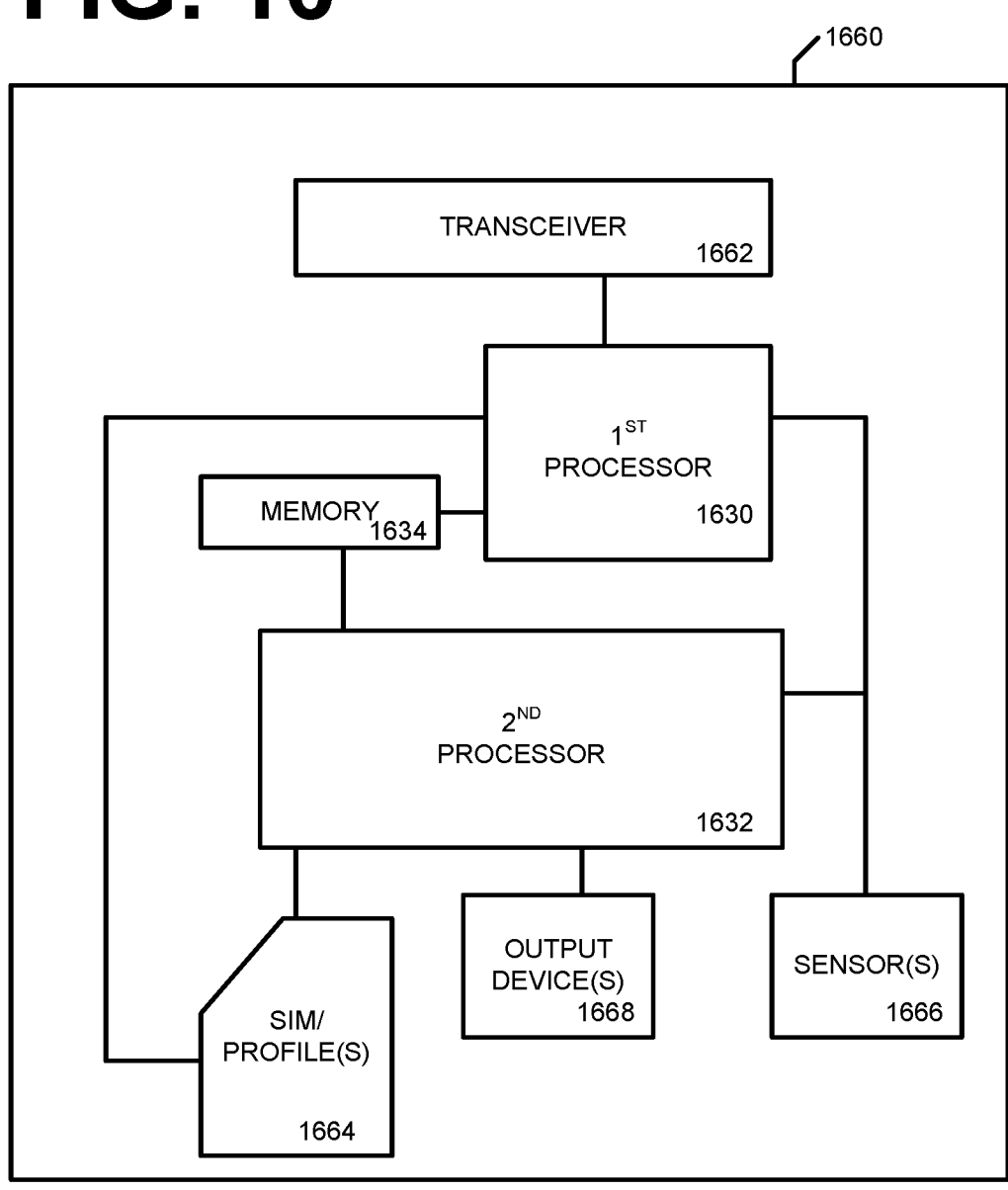
FIG. 16 illustrates a block diagram of an example wireless UE.

Turning to FIG. 16, the figure illustrates a block diagram of an example UE 1660. UE 1660 may comprise a smart phone, a wireless tablet, a laptop computer with wireless capability, a wearable device, a machine device that may facilitate vehicle telematics, a tracking device, remote sensing devices, and the like. UE 1660 comprises a first processor 1630, a second processor 1632, and a shared memory 1634. UE 1660 includes radio front end circuitry 1662, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1662 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 16, UE 1660 may also include a SIM 1664, or a SIM profile, which may comprise information stored in a memory (memory 34 or a separate memory portion), for facilitating wireless communication with RAN 105 or core network 130 shown in FIG. 1. FIG. 16 shows SIM 1664 as a single component in the shape of a conventional SIM card, but it will be appreciated that SIM 1664 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1664 and another device, which may be a component of RAN 105 or core network 130 shown in FIG. 1). A SIM profile 1664 may also comprise identifying information that is unique to the SIM, or SIM profile, such as, for example, an International Mobile Subscriber Identity ("IMSI") or information that may make up an IMSI.

SIM 1664 is shown coupled to both the first processor portion 1630 and the second processor portion 1632. Such an implementation may provide an advantage that first processor portion 30 may not need to request or receive information or data from SIM 1664 that second processor 1632 may request, thus eliminating the use of the first processor acting as a 'go-between' when the second processor uses information from the SIM in performing its functions and in executing applications. First processor 1630, which may be a modem processor or a baseband processor, is shown smaller than processor 1632, which may be a more sophisticated application processor, to visually indicate the relative levels of sophistication (i.e., processing capability and performance) and corresponding relative levels of operating power consumption levels between the two processor portions. Keeping the second processor portion 1632 asleep/inactive/in a low power state when UE 1660 does not need it for executing applications and processing data related to an application provides an advantage of reducing power consumption when the UE only needs to use the first processor portion 1630 while in listening mode for monitoring routine configured bearer management and mobility management/maintenance procedures, or for monitoring search spaces that the UE has been configured to monitor while the second processor portion remains inactive/asleep.

UE 1660 may also include sensors 1666, such as, for example, temperature sensors, accelerometers, gyroscopes, barometers, moisture sensors, and the like that may provide signals to the first processor 1630 or second processor 1632. Output devices 1668 may comprise, for example, one or more visual displays (e.g., computer monitors, VR appliances, and the like), acoustic transducers, such as speakers or microphones, vibration components, and the like. Output devices 1668 may comprise software that interfaces with output devices, for example, visual displays, speakers, microphones, touch sensation devices, smell or taste devices, and the like, that are external to UE 1660.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| UE | User equipment |
| WTRU | Wireless transmit receive unit |
| QCI | QoS Class Identifiers |
| BSR | Buffer status report |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

facilitating, by a user equipment comprising a processor, receiving, from a radio access network node, a first variable buffer status report configuration function;

generating, by the user equipment, a first buffer status report indication, corresponding to a first uplink traffic portion buffered in a first memory portion of the user equipment, according to the first variable buffer status report configuration function;

facilitating, by the user equipment, transmitting the first buffer status report indication to the radio access network node;

facilitating, by the user equipment, receiving, from the radio access network node, a first resource indication of a first uplink resource allocated by the radio access network node based on the first buffer status report indication;

facilitating, by the user equipment, transmitting, to the radio access network node using the first uplink resource, the first uplink traffic portion;

wherein the first variable buffer status report configuration function comprises one or more index functions of a first precision variable, and wherein the first variable buffer status report configuration function comprises one or more buffer status criterion functions corresponding to the one or more index functions, wherein at least one of the one or more buffer status criterion functions comprises the first precision variable, the method further comprising:

analyzing, by the user equipment, the first uplink traffic portion with respect to the one or more buffer status criterion functions to result in an analyzed first uplink traffic portion value;

determining, by the user equipment, a determined index function of the one or more index functions based on the analyzed first uplink traffic portion value; and determining, by the user equipment, a first index value corresponding to the first uplink traffic portion based on the determined index function, wherein the first buffer status report indication comprises a first index value.

2. The method of claim 1, wherein the first precision variable comprises a data amount.

3. The method of claim 1, further comprising:

facilitating, by the user equipment, receiving, from the radio access network node, a second variable buffer status report configuration function;

generating, by the user equipment, a second buffer status report indication, corresponding to a second uplink traffic portion buffered in a second memory portion of the user equipment, according to the second variable buffer status report configuration function;

facilitating, by the user equipment, transmitting the second buffer status report indication to the radio access network node;

facilitating, by the user equipment, receiving, from the radio access network node, a second resource indication of a second uplink resource allocated by the radio access network node based on the second buffer status report indication; and facilitating, by the user equipment, transmitting, to the radio access network node using the second uplink resource, the second uplink traffic portion.

4. The method of claim 3, wherein the first precision variable corresponds to a first uplink traffic type of the first uplink traffic portion, and wherein the second precision variable corresponds to a second uplink traffic type of the second uplink traffic portion.

5. The method of claim 4, wherein the first uplink traffic type corresponds to a configured first quality of service, and wherein the second uplink traffic type corresponds to a configured second quality of service.

6. The method of claim 1, wherein the first index value is generated based on the first precision variable.

7. The method of claim 3, wherein the second buffer status report indication comprises a second index value, and wherein the second index value is generated based on the second precision variable.

8. A user equipment, comprising:

a processor configured to:

receive, from a radio access network node, a first variable buffer status report configuration;

generate a first buffer status report indication, corresponding to a first uplink traffic portion buffered in a first memory portion of the user equipment, according to the first variable buffer status report configuration;

transmit the first buffer status report indication to the radio access network node;

receive, from the radio access network node, a first resource indication of a first uplink resource allocated by the radio access network node based on the first buffer status report indication;

transmit, to the radio access network node using the first uplink resource, the first uplink traffic portion;

wherein the first variable buffer status report configuration comprises one or more indexes that comprise one or more corresponding index functions of at least one of a first precision variable or a first bound variable, wherein the first variable buffer status report configuration comprises one or more buffer status criterion functions corresponding to the one or more index functions, wherein at least one of the buffer status criterion functions comprises at least one of the first precision variable or the first bound variable, and wherein the processor is further configured to:

analyze the first uplink traffic portion with respect to the one or more buffer status criterion functions to result in an analyzed first uplink traffic portion value;

determine a determined index function of the one or more index functions based on the analyzed first uplink traffic portion value; and determine a first index value corresponding to the first uplink traffic portion based on the determined index function, wherein the first buffer status report indication comprises the first index value, and wherein the first precision variable comprises a data amount.

9. The user equipment of claim 8, wherein the data amount of the first precision variable corresponds to a memory size of the first memory portion.

10. The user equipment of claim 8, wherein the data amount of the first precision variable corresponds to a traffic size of the first uplink traffic portion buffered in the first memory portion.

11. The user equipment of claim 8, wherein the processor is further configured to:

receive from the radio access network node, a second variable buffer status report configuration;

generate a second buffer status report indication, corresponding to a second uplink traffic portion buffered in a second memory portion of the user equipment, according to the second variable buffer status report configuration;

transmit the second buffer status report indication to the radio access network node;

receive, from the radio access network node, a second resource indication of a second uplink resource allocated by the radio access network node based on the second buffer status report indication; and transmit, to the radio access network node using the second uplink resource, the second uplink traffic portion, wherein the first precision variable corresponds to a first uplink traffic type, wherein a second precision variable corresponds to a second uplink traffic type, wherein the first uplink traffic type corresponds to a first quality of service, wherein the second uplink traffic type corresponds to a second quality of service, wherein the first index value is generated based on the determined index function, and the first precision variable or the first bound variable, and wherein a second index value is generated based on a second index function of the second buffer status report configuration, and a second precision variable or a second bound variable of the second variable buffer status report configuration.

12. The user equipment of claim 11, wherein the data amount of the first precision variable corresponds to a traffic size of the first uplink traffic portion buffered in the first memory portion.

13. A non-transitory machine-readable medium, comprising executable instructions that, when executed by a processor of a user equipment, facilitate performance of operations, comprising:

receiving, from a radio access network node, a variable buffer status report configuration comprising a first index function and a second index function, a first buffer status criterion function corresponding to the first index function, and a second buffer status criterion function corresponding to the second index function;

generating a first buffer status report indication, corresponding to a first uplink traffic portion buffered in a memory of the user equipment, according to the variable buffer status report configuration;

transmitting the first buffer status report indication to the radio access network node;

receiving, from the radio access network node, a first resource indication of a first uplink resource allocated by the radio access network node based on the first buffer status report indication; and transmitting, to the radio access network node using the first uplink resource, the first uplink traffic portion, wherein the first buffer status criterion function or the first index function comprises at least one of a first precision variable or a first bound variable, and wherein the second buffer status criterion function or the second index function comprises at least one of a second precision variable or a second bound variable.

14. The non-transitory machine-readable medium of claim 13, wherein the first buffer status report indication is generated according to the first index function based on the first uplink traffic portion having a traffic portion size that corresponds to the first precision variable.

15. The non-transitory machine-readable medium of claim 13, wherein the first buffer status report indication is generated according to the second index function based on the first uplink traffic portion having a traffic portion size that corresponds to the second precision variable.

16. The non-transitory machine-readable medium of claim 13, wherein the operations further comprise:

generating a second buffer status report indication, corresponding to a second uplink traffic portion buffered in the memory of the user equipment, according to the variable buffer status report configuration;

transmitting the second buffer status report indication to the radio access network node;

receiving, from the radio access network node, a second resource indication of a second uplink resource allocated by the radio access network node based on the second buffer status report indication; and transmitting, to the radio access network node using the second uplink resource, the second uplink traffic portion.

17. The non-transitory machine-readable medium of claim 16, wherein the first uplink traffic portion corresponds to a first type of traffic, wherein the second uplink traffic portion corresponds to a second type of traffic, wherein the first precision variable corresponds to the first type of traffic, wherein the second precision variable corresponds to the second type of traffic, wherein the first buffer status report indication is generated according to the first index function and the first buffer status criterion function, and wherein the second buffer status report indication is generated according to the second index function and the second buffer status criterion function.

18. The method of claim 1, further comprising:

determining, by the user equipment, to generate the first buffer status report indication according to the first variable buffer status report configuration function based on a traffic type associated with the first uplink traffic portion buffered in the first memory portion of the user equipment.

19. The method of claim 3, further comprising:

determining, by the user equipment, to generate the first buffer status report indication according to the first variable buffer status report configuration function based on a first traffic type associated with the first uplink traffic portion buffered in the first memory portion of the user equipment; and determining, by the user equipment, to generate the second buffer status report indication according to the second variable buffer status report configuration function based on a second traffic type associated with the second uplink traffic portion buffered in the second memory portion of the user equipment, wherein the first traffic type and the second traffic type are different.

20. The user equipment of claim 11, wherein the operations further comprise:

determining to generate the first buffer status report indication according to the first variable buffer status report configuration based on a first traffic type associated with the first uplink traffic portion buffered in the first memory portion of the user equipment; and determining to generate the second buffer status report indication according to the second variable buffer status report configuration based on a second traffic type associated with the second uplink traffic portion buffered in the second memory portion of the user equipment, wherein the first traffic type and the second traffic type are different.

* * * * *